United States Patent
Combelles et al.

(10) Patent No.: US 7,099,396 B1
(45) Date of Patent: Aug. 29, 2006

(54) MULTICARRIER MODULATION USING WEIGHTED PROTOTYPE FUNCTIONS

(75) Inventors: Pierre M. Combelles, Rennes (FR); Dominique M. LaCroix, Rennes (FR); Ali M. Jalali, Rennes (FR)

(73) Assignees: France Telecom, Paris (FR); Telediffusion de France, Paris (FR)

(*) Notice: Subject to any disclaimer, the term of this patent is extended or adjusted under 35 U.S.C. 154(b) by 0 days.

(21) Appl. No.: 09/446,958

(22) PCT Filed: Jun. 30, 1998

(86) PCT No.: PCT/FR98/01398

§ 371 (c)(1),
(2), (4) Date: Nov. 12, 2002

(87) PCT Pub. No.: WO99/01967

PCT Pub. Date: Jan. 14, 1999

(30) Foreign Application Priority Data

Jul. 1, 1997 (FR) .................................. 97 08547

(51) Int. Cl.
*H04L 27/28* (2006.01)
(52) U.S. Cl. .............. 375/260; 375/261; 370/210; 455/59
(58) Field of Classification Search .......... 375/260, 375/261, 229; 370/210; 455/59; 341/111
See application file for complete search history.

(56) References Cited

U.S. PATENT DOCUMENTS

| | | | | |
|---|---|---|---|---|
| 4,792,943 A | * | 12/1988 | Gockler .................... | 370/210 |
| 5,636,246 A | * | 6/1997 | Tzannes et al. ............. | 375/260 |
| 5,671,168 A | * | 9/1997 | Liu et al. ................... | 708/321 |
| 5,838,268 A | * | 11/1998 | Frenkel ...................... | 341/111 |

FOREIGN PATENT DOCUMENTS

EP    668 679    8/1995

OTHER PUBLICATIONS

XP-000577280; Multirate Extensions to Cossap and Lessons Learnt from Developing Advanced Models; 1993; G.R. Danesfahani, T.G. Jeans, Professor B.G. Evans; pp. 1-6.
XP-000304924; Orthogonal Multiple Carrier Data Transmission; Norbert J. Fliege; May-Jun. 1992; pp. 255-264.

* cited by examiner

*Primary Examiner*—Shuwang Liu
(74) *Attorney, Agent, or Firm*—Merchant & Gould P.C.

(57) ABSTRACT

A method of modulating a multicarrier signal involves obtaining a set of 2M representative complex coefficients of transmitted data. 2LM linear combinations are calculated so as to leave 2M obtained complex coefficients. Coefficients of balancing used in these combinations represent a prototype function g(t). The 2LM coefficients are summed in given areas of memory. The 2LM memory sites represent 2L groups of M distinct partial sums. The transmitted samples are sent so as to gradually form M samples to transmit, in the memory sites, over a defined duration.

19 Claims, 25 Drawing Sheets

MULTICARRIER MODULATION USING WEIGHTED PROTOTYPE FUNCTIONS

This application is an application under 35 U.S.C. 371 of PCT International Application No. PCT/FR98/01398 which has an International filing data of Jun. 30, 1998, which claims priority on France Patent Application number 97 08547 filed Jul. 01, 1997.

FIELD OF THE INVENTION

1-1 General Points

The field of the invention is that of the transmission or broadcasting of digital data, or of analog and sampled data, designed to be received especially by mobiles. More specifically, the invention relates to the implementation of OFDM/OQAM type multicarrier signals. In other words, the invention applies to density 2 or even higher density signals.

It is known that multicarrier modulation has many useful features, especially when it is associated with error-correcting encoding and interleaving. The COFDM (Coded Orthogonal Frequency Division Multiplexing) technique has also been chosen for the European digital audio broadcasting (DAB) standard and for the terrestrial digital video broadcasting (DVB-T).

The COFDM technique offers a particularly simple system of equalization, namely the use of a guard interval, also called a cyclical prefix. This cyclical prefix provides for robust behaviour in the face of the echoes but at the cost of a relatively major loss of spectral efficiency.

This problem is discussed inter alia in the French patent application No. FR-95 05455 (in which the COFDM modulation is called an OFDM/QAM modulation). To overcome this problem, this patent document presents a new technique for the implementation of OFDM/OQAM type multicarrier modulations.

It will be noted that the different types of modulation discussed hereinafter are designated in a slightly different way in this prior art document and in the present patent application. The following table gives the correspondence;

| FR95 05455: | Present Document: |
|---|---|
| OFDM/QAM | OFDM/QAM/OFDM |
| OFDM/OQAM | OFDM/OQAM/NYQUIST |
| OFDM/OMSK | OFDM/OQAM/MSK |
| OFDM/IOTA | OFDM/OQAM/IOTA |

The term terme <<OQAM>> refers to the <<Offset Quadratic Amplitude Modulation>> definition. This expresses the fact that, for such modulations, there is a temporal offset between the transmission of the in-phase part and that of the in-quadrature part of the QAM symbol.

1-2 Applications

The invention can be applied in very many fields, especially when high spectral efficiency is sought and when the channel is highly non-stationary.

A first category of applications relates to terrestrial digital radio-broadcasting, whether of images, sound and/or data. In particular, the invention can be applied to synchronous broadcasting which intrinsically generates long-term multiple paths. It can also be advantageously applied to broadcasting towards mobile bodies.

Another category of applications relates to digital radio-communications. The invention can be applied especially in systems of digital communications towards mobiles using high bit rates.

2—Reminders

2-1 Transmission Channel

In a radiomobile environment, the transmitted wave undergoes multiple reflections, and the receiver therefore receives a sum of versions delayed by the transmitted signal. Each of these versions is attenuated and phase-shifted randomly. Since the receiver is assumed to be in motion, the Doppler effect acts also on each path.

The conjunction of these efforts results in a non-stationary channel with deep fading at certain frequencies (frequency selective channel). For the applications referred to here, the transmission band is greater than the coherence band of the channel (the band for the frequency response to the channel may be considered to be constant on a given duration), and fading thus appears in the band, i.e. at a given point in time, certain frequencies are highly attenuated.

2-2 Description of a Multicarrier Modulation

A multicarrier modulation is above all a digital modulation, namely a method for the generation of an electromagnetic signal out of the digital information to be transmitted. The originality and value of such a modulation is that it subdivides the limited band allocated to the signal into subbands. In these subbands, which have a chosen width smaller than the coherence band of the channel, the channel may be considered to be constant for a duration of transmission of a symbol, chosen to be smaller than the coherence time of the channel.

The digital information to be transmitted during this period is then distributed over each of these subbands. This has two uses in particular:

reducing the modulation speed (namely increasing the symbol duration) without modifying the transmitted bit rate, simply modelling the action of the channel on each of the subbands: complex multiplier.

It will be noted that, in reception, a system of low complexity for the correction of the data elements received (complex division by the estimated channel) enables a recovery of the information transmitted on each of the carriers satisfactorily except for the carriers that have undergone a deep fading. In this case, if no steps for protecting the information have been taken, the data elements conveyed by these carriers will be lost. A multicarrier system therefore ensures the generation of the electrical system must be preceded by digital data processing (error corrective encoding and interleaving).

The patent No. FR 95/05455 gives a detailed description of the two types of existing multicarrier modulation. Their characteristics may be briefly recalled here.

2-2-2 Notations

Spacing between two adjacent carriers of the multiplex of carriers: $v_o$.

Temporal spacing between two multicarrier symbols transmitted (symbol time): $\tau_o$.

2-2-3 The Prototype Function

The shaping filter for each of the carriers of the multiplex is the same. It corresponds to the prototype function characterizing the multicarrier modulation.

Let g(t) be this prototype function, the signal transmitted at each instant $n\tau_o$, on the $m^{th}$ central frequency subband $v_m$, is $\alpha_{m,n} e^{i\varphi m,n} e^{2i\pi v m t} g(t-n t_o)$.

In baseband, the expression of the signal transmitted, centered on the frequency $Mv_o$ is therefore:

$$s(t) = \sum_{n} \sum_{m=0}^{2M-1} a_{m,n} e^{i\varphi m,n} e^{2i\pi m v_0 t} g(t - n\tau_0) \quad (1)$$

The functions $e^{i\varphi m,n} e^{2i\pi m v o t} g(t-n\tau_o)$ are called time-frequency translated functions of g(t). To retrieve the information transmitted by each of the subcarries, it is necessary to choose g(t) so that its time-frequency translated functions are separable. To be sure of this, it is laid down that these translated functions should be orthogonal in the sense of a scalar product defined on all the finite energy functions (which is a Hilbert space in the mathematical sense). This space accepts two possible scalar products, namely:

- the complex $PS\langle x|y\rangle = \int_R x(t) y^*(t) dt$

- the real $PS\langle x|y\rangle = \Re e\left(\int_R x(t) y^*(t) dt\right)$

Thus two type of multicarrier modulation are defined:

complex type, or again OFDM/QAM: the function g(t) chosen guarantees and orthogonality of its translated functions in the complex sense (example: OFDM, also called OFDM/QAM/OFDM). In this case, $\phi_{m,n}=0$ and the data elements $\alpha_{m,n}$ are complex, real type or again OFDM/OQAM: the function g(t) chosen guarantees an orthogonality of its translated functions in the real sense (examples: OFDM/OQAM/NYQUIST, OFDM/OQAM/MSK, OFDM/OQAM/IOTA).

In this case, $\phi_{m,n}=(\pi/2)*(m+n)$ and the data elements $\alpha_{m,n}$ are real.

2-2-4 Density of the "Time-Frequency" Network

Since these modulations are designed for transmission at high bit rates, they will be associated with fairly high spectral efficiency values, in the range of 4 bits/s/Hz (digital television). The mapping of the bits coming from the error correction encoder will thus be of the QAM type.

For an OFDM/QAM modulation, the real and imaginary parts of a complex function derived from the QAM constellation are transmitted simultaneously at every symbol time $T_s$.

In the case of an OFDM/OQAM type modulation, they are transmitted with a temporal offset (QAM offset) of half a symbol time $(T_s/2)$. For one and the same transmission band and one and the same number of subcarriers, it is therefore necessary, for one and the same bit rate to be transmitted, that the rate of transmission of OFDM/OQAM type multicarrier symbols should be twice that of the OFDM/QAM type multicarrier symbols.

These two modes of transmission of information are characterized by the density of the time-frequency network $d=1(v_o.\tau_o)$. The OFDM/OQAM type multicarrier modulations the correspond to a density $d=2$, and those of the OFDM/QAM type correspond to a density of $d=1$.

It may be noted that a multicarrier modulation is characterized by:

the density of the "time-frequency" network on which it is defined, the prototype function.

The implementation of an OFDM/OQAM modulations with a density 2, and of the corresponding demodulation, requires substantial computation power and high storage capacity. This therefore underlines the fact that the corresponding instruments are relatively complex and costly.

3—Goals of the Invention

The invention is designed especially to overcome or reduce these drawbacks. More specifically, a goal of the invention is to provide techniques for the modulation and demodulation of the multicarrier signals that are simple and cost little to implement as compared with the direct approaches.

In other words, it is a goal of the invention to give modulation and demodulation techniques of this kind that limit the number of operations to be performed and the necessary storage capacity.

4—Description of the Invention

These goals are well as others that shall appear hereinafter are achieved according to the invention by means of a method for the modulation of a multicarrier signal with a density $1/(v_o.\tau_o)=2$, formed by successive symbols, each comprising M samples to be transmitted and constituted by a set of 2M orthogonal carrier frequencies in the real sense, the interval between two neighboring carrier frequencies being equal to $v_o$ and the interval between the times of transmission of two consecutive symbols, or the symbol time, being equal to $\tau_o$, each of said carrier frequencies being modulated according to one and the same modulation prototype function g(t) with a truncation length of $2L\tau_o$, the method comprising, at each symbol time, the following steps:

the obtaining of a set of 2M complex coefficients representing data to be transmitted;

the computing of 2LM linear combinations from said 2M complex coefficients obtained, the weighting coefficients used in these combinations representing said prototype function g(t), so as to obtain 2LM coefficients;

the summing of said 2LM coefficients weighted in the predetermined storage locations of a memory comprising 2LM storage locations representing 2L groups of M distinct partial sums, so as to gradually form, in said storage locations, over a duration of $2L\tau_o$, M samples to be transmitted;

the sending of said samples to be transmitted.

Thus, according to the invention, the data elements to be processed are stored after weighting and not before. It is thus possible to reduce the memory capacity needed as well as the number of operations performed. The samples to be transmitted are built gradually in each field of storage.

Accordingly to one advantageous embodiment of the invention, a sample to be transmitted at the instant $j\tau_o + k\tau_o/M$, referenced $s_{k+jm}$ is written as follows:

$$s_{k+jM} = \sum_{q=0}^{2L-1} [\alpha_{k,q} C_{k,j-q} + \beta_{k,q} C_{k+M,j-q}]$$

where:

$C_{oj}$ to $C_{2M-1j}$ are the 2M complex coefficients generated between the instants $j\tau_o$ and $(j+1)\tau_o$;

$\alpha_{k,q}$ and $\beta_{k,q}$ are said weighting coefficients.

In the case of an OFDM/OQAM modulation, we will generally have:

$\alpha_{k,q}=0$ for q as an odd parity number;

$\beta_{k,q}=0$ for q as an even parity number.

The number of operations performed is therefore further reduced by half.

In a preferred embodiment of the invention, the method comprises, for the generation of a symbol with an index j formed by M samples, the following steps:

the obtaining of 2M real inputs $a_{m,n}$ representing a source signal;

the pre-modulation of each of said real inputs producing 2M complex coefficients.

the reverse Fourier transform of said 2M complex coefficients producing 2M complex transform coefficients $C_{oj}$ to $C_{2M-1j}$;

for each of the M pairs $(C_{kj}, C_{(k+M)j})$ of said transform coefficients, the computation of 2L weighted coefficients, the weighing coefficients representing said prototype function;

the addition of the result of each of said weighted 2LM values to the contents of the 2LM distinct memory zones so as to gradually build the samples to be transmitted constituting the symbols j, (j+1), (j+2), ... (j+2L−1);

the sending of M samples corresponding to the M oldest contents of said memory zones and then the resetting of the contents of said M memory zones.

In general, said steps will be implemented at the rate $\tau_o/M$ of the samples.

The checking of the storage means is very simple. Thus, each sending step may be followed by a step for the updating of said memory locations comprising:

a physical shifting of the contents of each of said memory locations if the latter are elements of a shift register; or an updating of the write and read addresses of said memory locations, if the latter are elements of a RAM.

According to an advantageous characteristic of the invention, said coefficients representing data elements to be transmitted are obtained by the implementation of a mathematical transform comprising the following steps:

the application of a real reverse Fourier transform;

the circular permutation of the result of this reverse transform by M/2 coefficients leftwards;

the multiplication of each of said coefficients by $i^n$.

It is thus possible to obtain complex transform coefficients from an FFT with real inputs. Again, this makes it possible to limit the number of operations performed.

It is furthermore possible to simplify the computations by slightly modifying the equation of the signal centered on the frequency $Mv_o$ so that it is written as follows:

$$s(t) = \sum_n \sum_{m=0}^{2M-1} a_{m,n}(-1)^{m(n+L)} i^{m+n} e^{2i\pi m v_0 t} g(t-n\tau_0)$$

The invention also relates to the modulation devices implementing a modulation method of this kind.

According to a particular embodiment, this device comprises especially:

means of mathematical transformation delivering said coefficients representing data elements to be transmitted at the rate $\tau_o/2M$ and in the following order $(C_{oj}, C_{M+1j}), \ldots (C_{M-1j}, C_{2M-1j})$;

2LM-M simultaneous read/write RAM type memory locations;

N complex multipliers working at the rate $N\tau_o/2LM$, N being equal to 1, 2, 4, ... or 2L.

Thus, the memory space is further reduced.

The invention also relates to a method for the demodulation of a received signal corresponding to a multicarrier emitted signal with a density $1/(v_o.\tau_o)=2$. According to this method, an estimation of 2M real data elements transmitted at a given symbol time is reconstituted by means of the following steps:

the sampling of said signal received at the sample frequency $\tau_o/M$, delivering M complex samples received;

the storage of each of said M complex samples received in a predetermined location of an input memory comprising 2ML complex locations, in which there have been previously memorized (2L−1)M samples received during the 2L-1 previous symbol times;

the multiplication of the 2ML values contained in said input memory by coefficients representing said prototype function;

temporal aliasing, by the summing up of 2M series of L results of multiplication, so as to obtain 2M complex values;

the processing of said 2M complex values to form said estimations of the 2M real data elements transmitted.

Advantageously, the 2M complex values derived from the temporal aliasing step between the instants $(j+2L-1)\tau_o$ and $(j+2L)\tau_o$ are written as follows:

$$R_{k',j} = \sum_{q'=0}^{2L-1} \alpha'_{k,q} r_{k'+(j+q')M}$$

$$R_{k'+M,j} = \sum_{q'=0}^{2L-1} \beta'_{k,q} r_{k'+(j+q')M}$$

where:

$r_{k'+(j+q')M}$ represents the sample received at the instant $k'\tau_o+(j+q')\tau_o/M$;

$\alpha'_{k,q}$ and $\beta'_{k,q}$ are said weighting coefficients.

Most usually, the computations will be simplified because:

$\alpha'_{k,q'}=0$ for q' as an odd parity value;

$\beta'_{k,q'}=0$ for q' as an even parity value.

According to a preferred embodiment, said processing step comprises the following steps:

the application of a mathematical transformation that is the reverse of the one performed during the modulation on said 2M complex values delivering 2M transformed values;

the correction of phase and/or amplitude distortions due to the transmission channel;

the extraction of the real part of said transformed complex values.

In general, said steps are implemented at the rate $\tau_o/M$ of the samples.

The invention also relates to the demodulation devices implementing this method. These devices comprise:

means for the sampling of said received signal;

means for the temporary storage of the complex sample functions comprising 2ML complex locations;

means for the multiplication of said memorized samples by weighting coefficients representing said prototype function;

temporal aliasing means summing up L weighting results so as to obtain 2M complex values;

means for the processing of said complex values delivering an estimation of 2M real data elements transmitted at each symbol time.

It is possible to further reduce the memory space needed in this device by means of:

storage means comprising 2ML-M simultaneous write/read RAM type complex memory locations;

N complex multipliers working at the $N\tau_o/2LM$ rate, where N is equal to 1, 2, 4 . . . or 2L;

means of mathematical transformation working at the $\tau_o/2M$ rate, whose inputs $R_{oj}$ to $R_{2M-1j}$ are read in the order $(R_{oj}, R_{Mj})$, $(R_{1j}, R_{M+1j})$, . . . $(R_{M-1j}, R_{2M-1j})$.

Finally, the invention more generally relates to a filtering method delivering series of M complex output values at regular intervals from 2L series of 2M complex input values, said M complex values corresponding to a weighted sum of 2L of said complex input values to be processed, comprising the following steps for each series of complex input values:

the computation of 2LM linear combinations from said 2M complex coefficients obtained, the weighting coefficients being derived from 2L real or complex filters with a size M, so as to obtain 2LM coefficients;

the summing of each of the weighted values in a predetermined memory location out of a set of 2ML memory locations each containing a partial sum so as to gradually form said output values in said memory locations on a period corresponding to the reception of 2L series of complex input values.

The term "filtering" must of course be taken here in its general sense of processing or computation performed on data elements. This processing which comprises the computation of a weighted sum is done gradually.

5—DESCRIPTION OF A PREFERRED EMBODIMENT

5-1 List of Figures

Other features and advantages of the invention shall appear more clearly from the following description of a preferred embodiment of the invention given as a simple non-restrictive illustration and from the appended drawings, of which:

FIG. 1 gives a general and simplified illustration of the method of modulation of the invention (step j) used to generate M samples;

Figure 3:
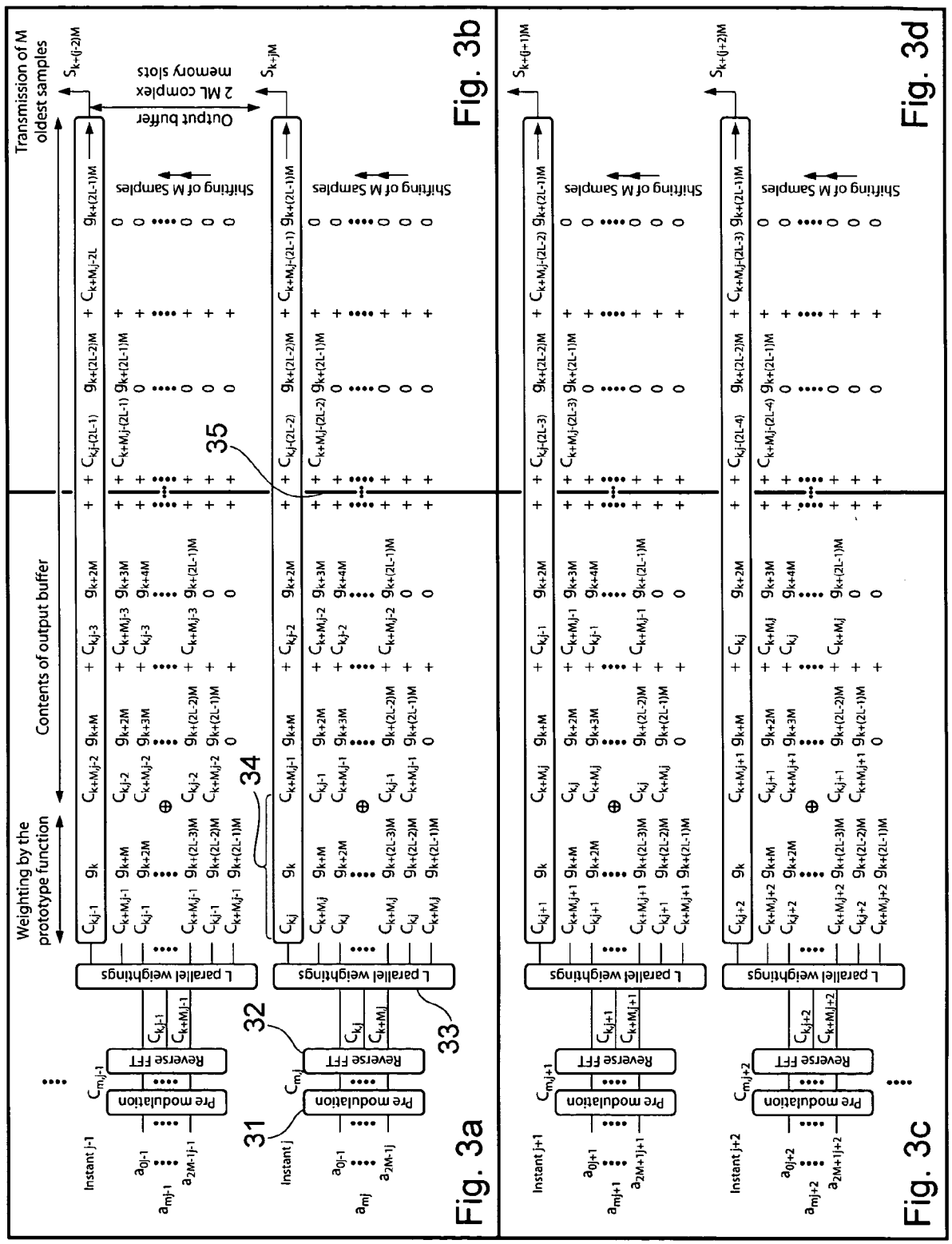
Figure 3A:
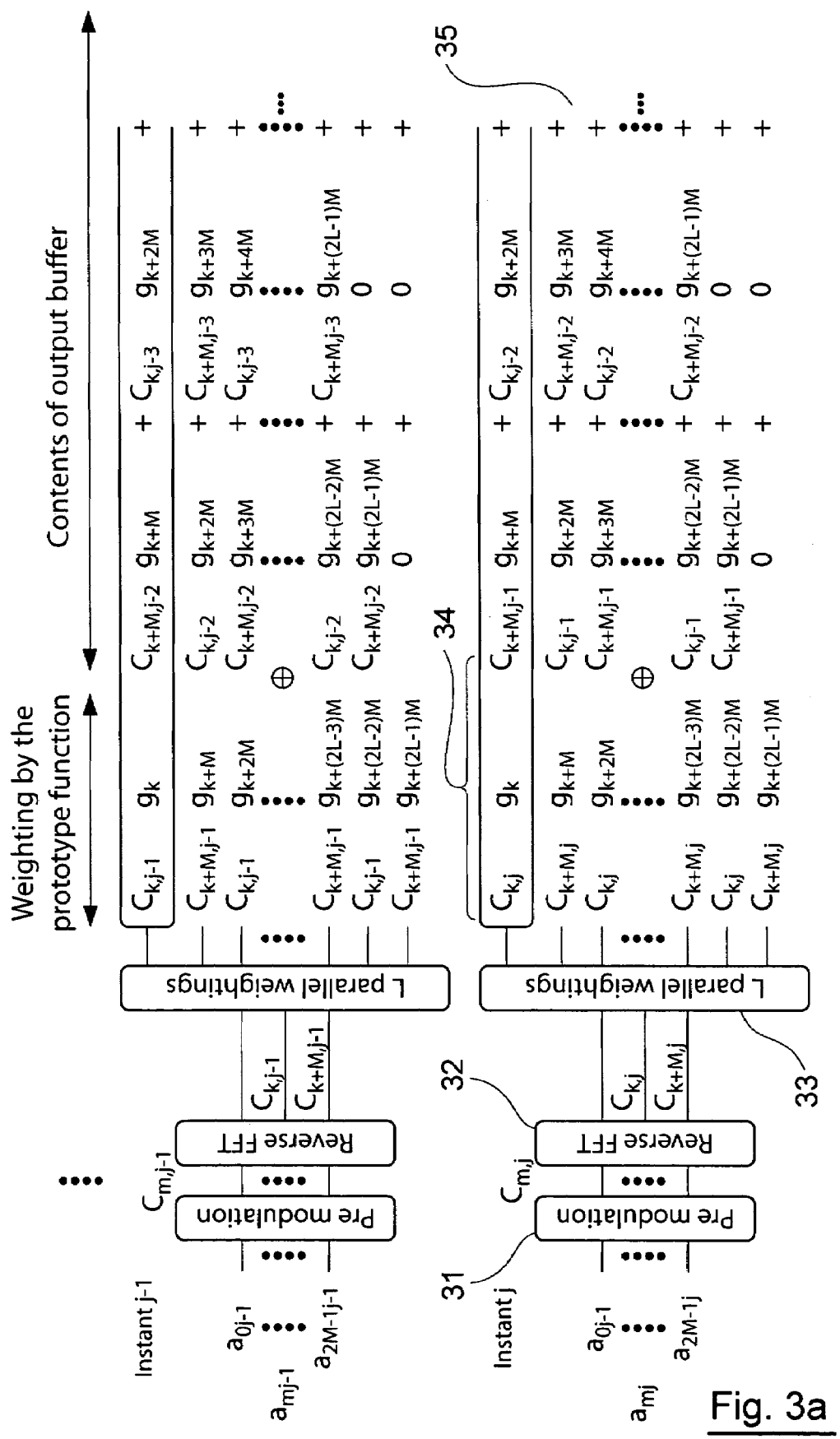
Figure 3B:
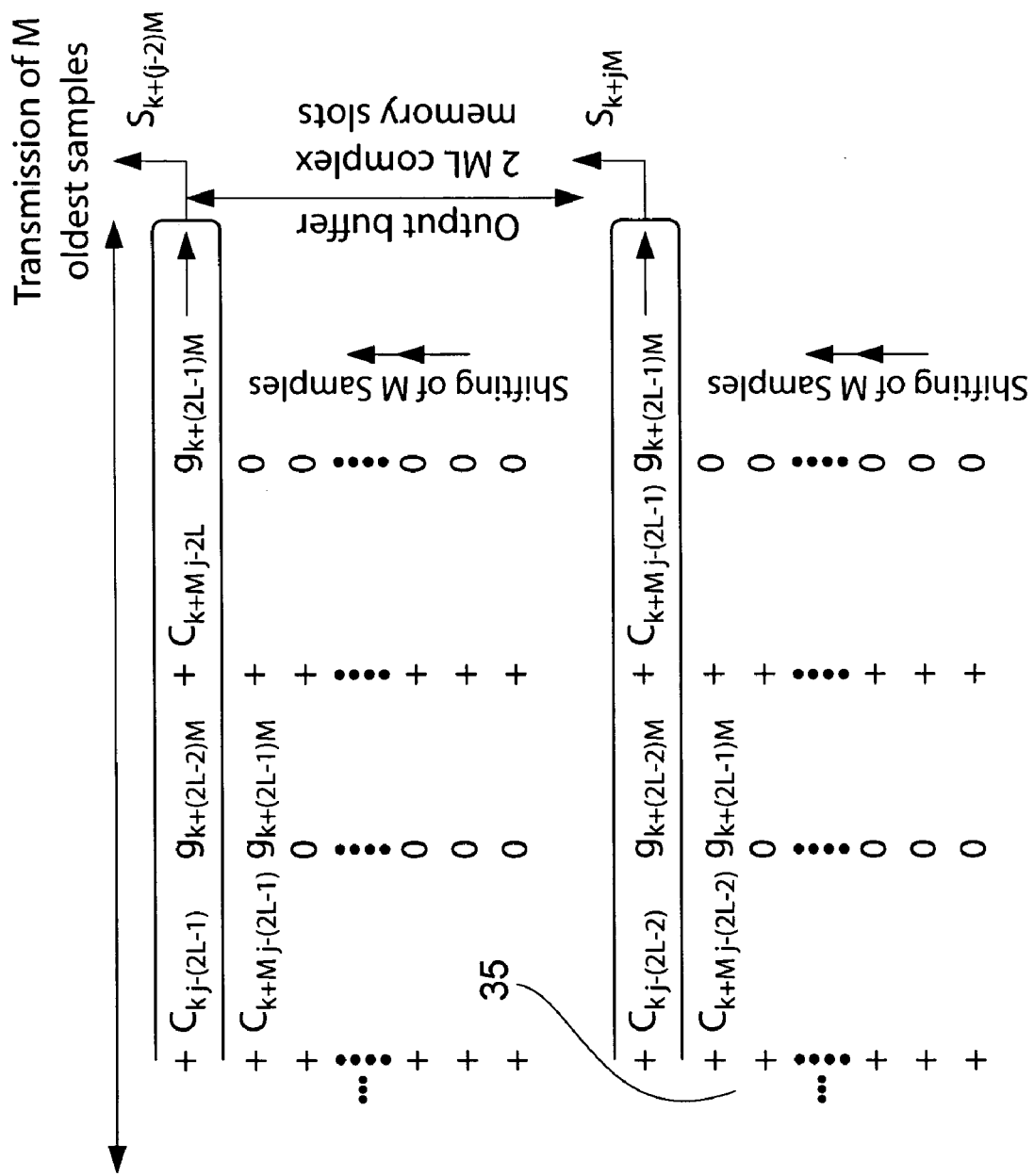
Figure 3C:
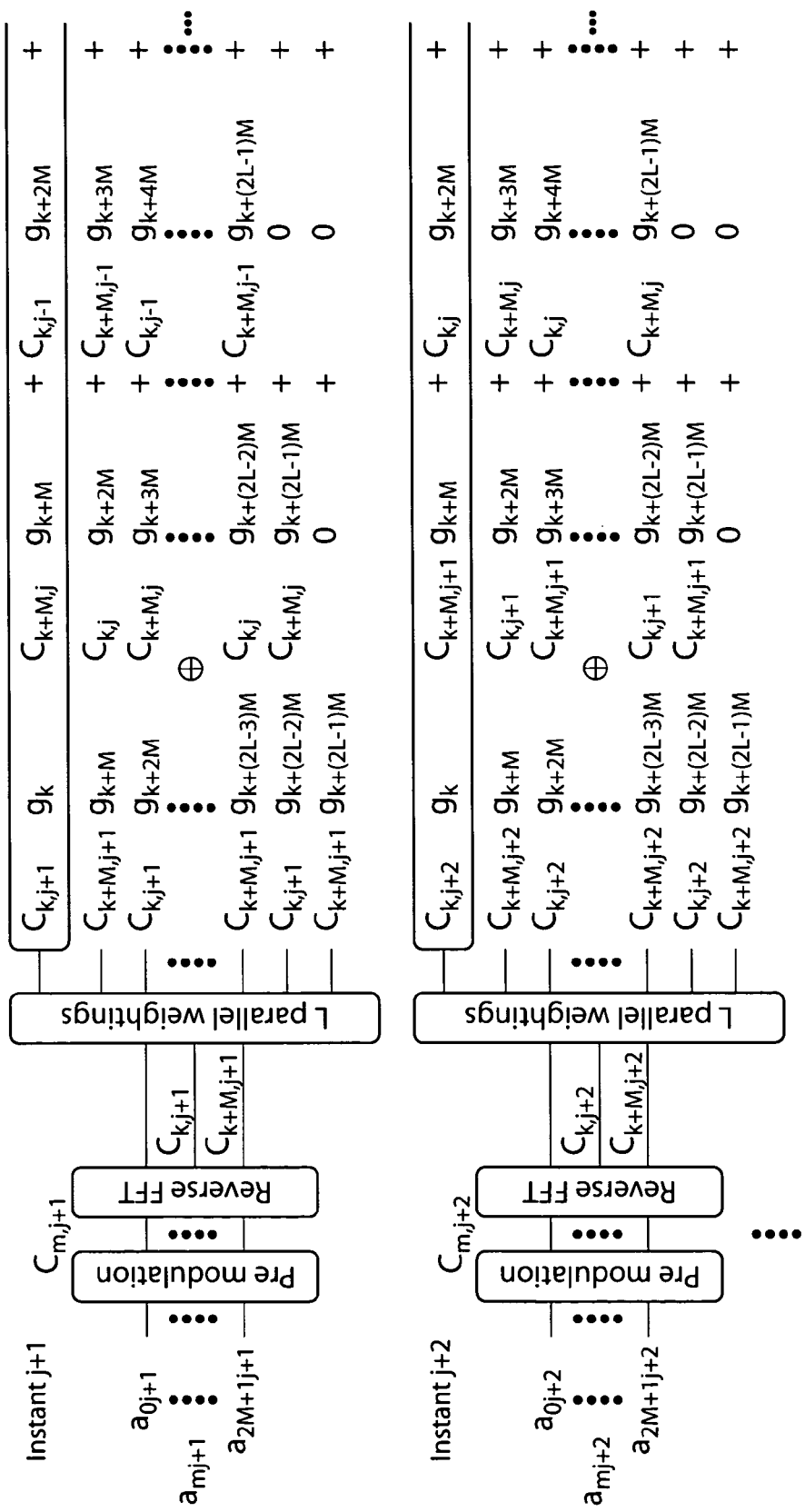
Figure 3D:
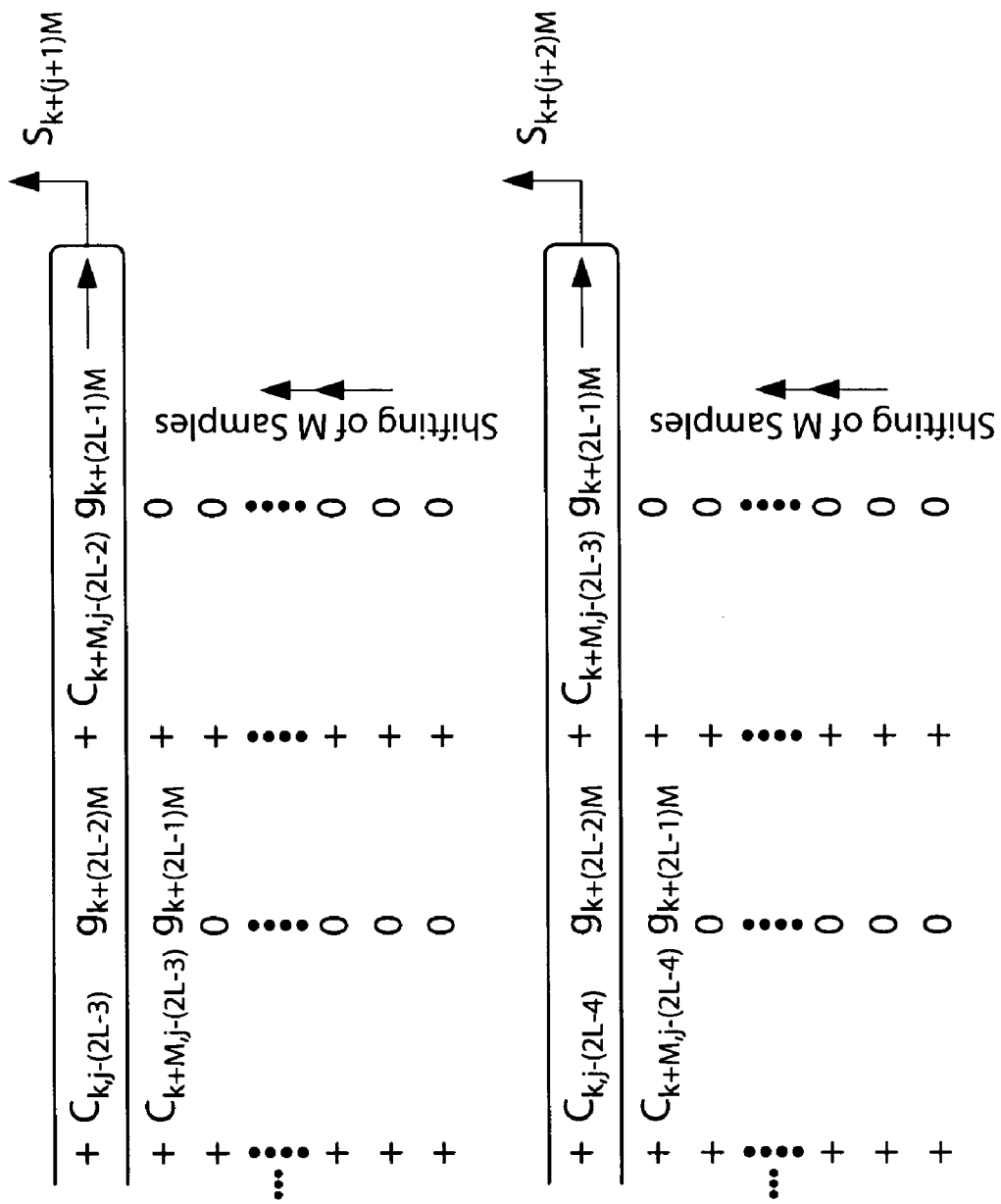

FIG. 3 gives a more detailed illustration of the working of the method of modulation of the invention for the instances j−1 to j+2;

FIGS. 3a, 3b, 3c and 3d are closer views of portions of FIG. 3, broken out as indicated by the lines on FIG. 3.

Figure 4:
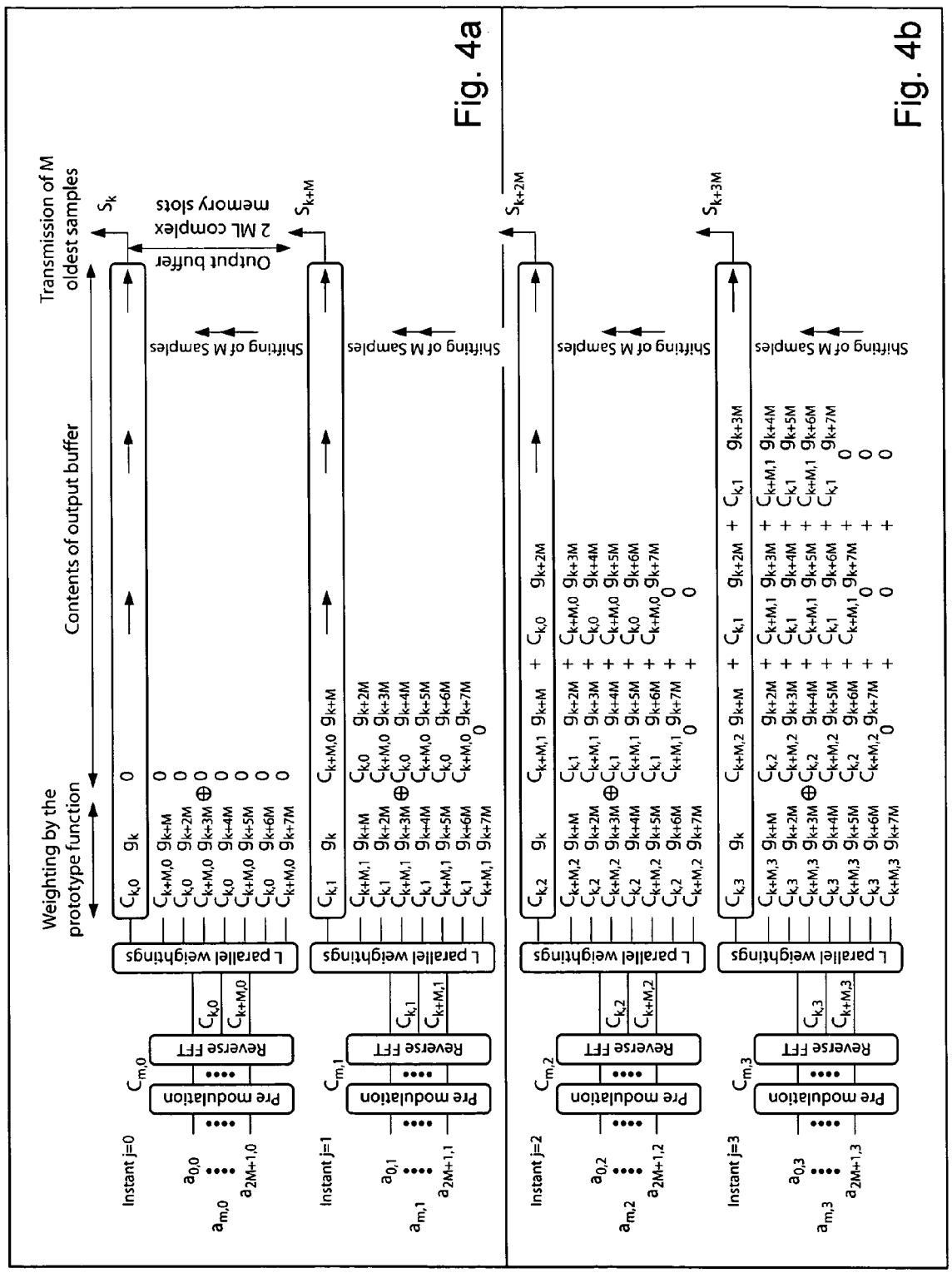
Figure 4A:
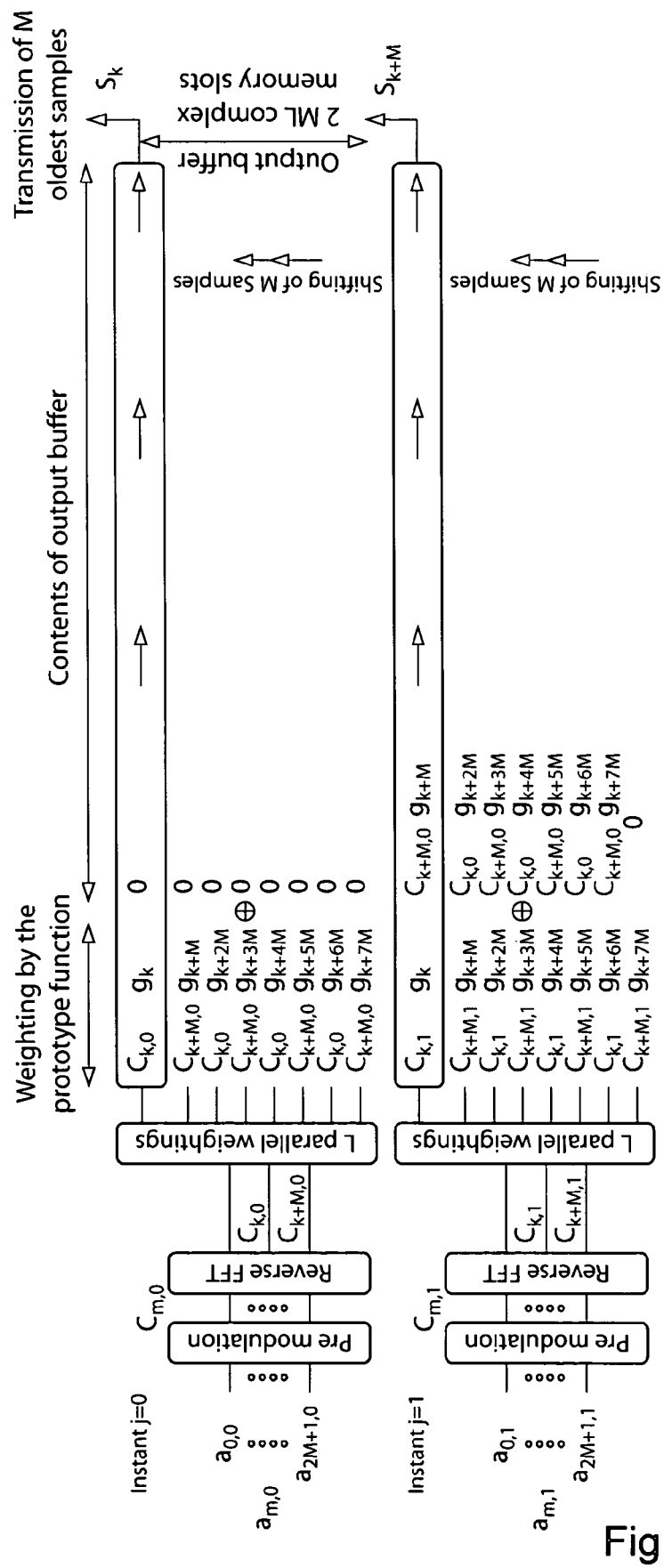
Figure 4B:
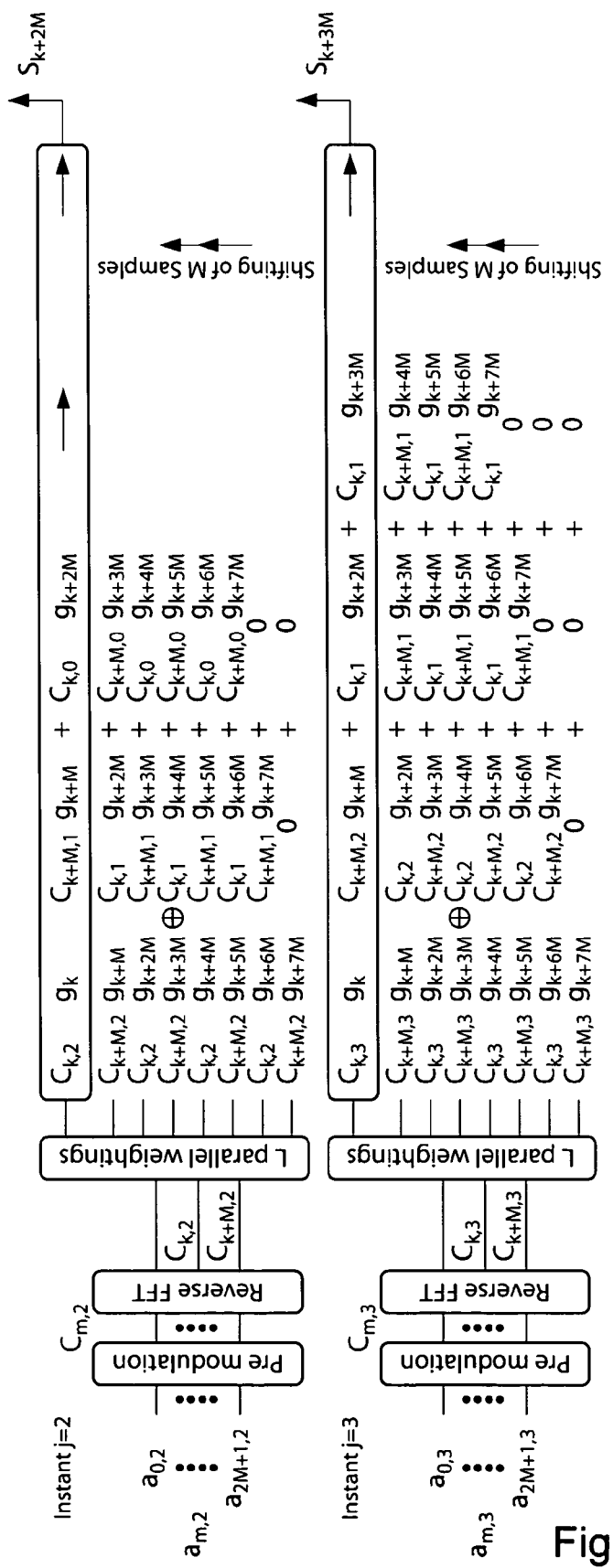

FIG. 4 specifies the initiation of the procedure of modulation of FIG. 3, where L=4;

FIGS. 4a and 4b are closer views of portions of FIG. 4, broken out as indicated by the lines of FIG. 4.

Figure 5:
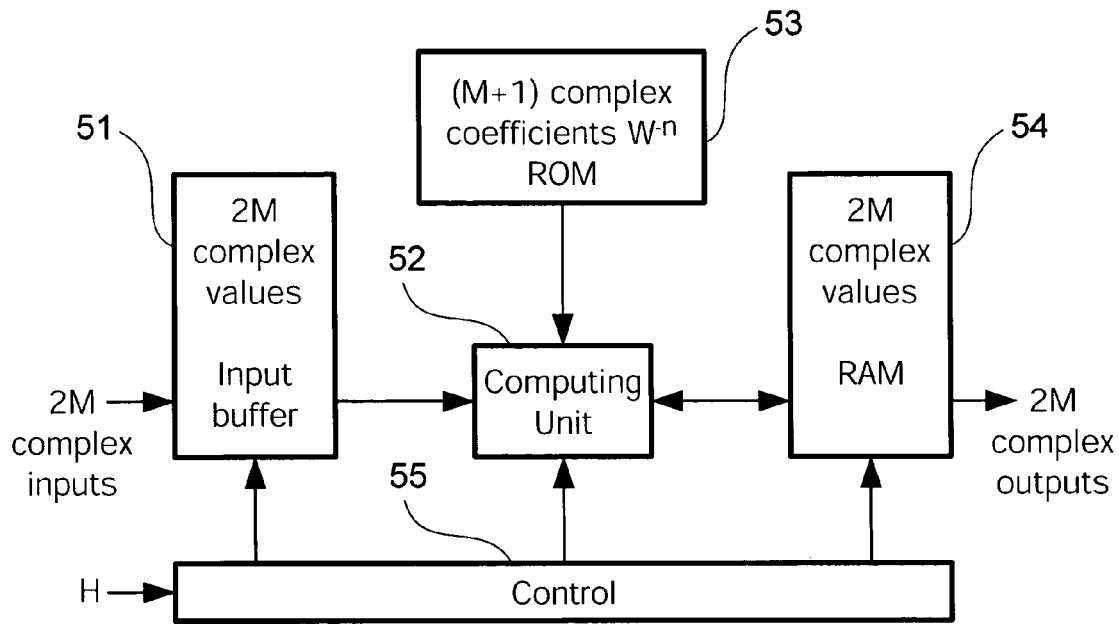
Figure 6A:
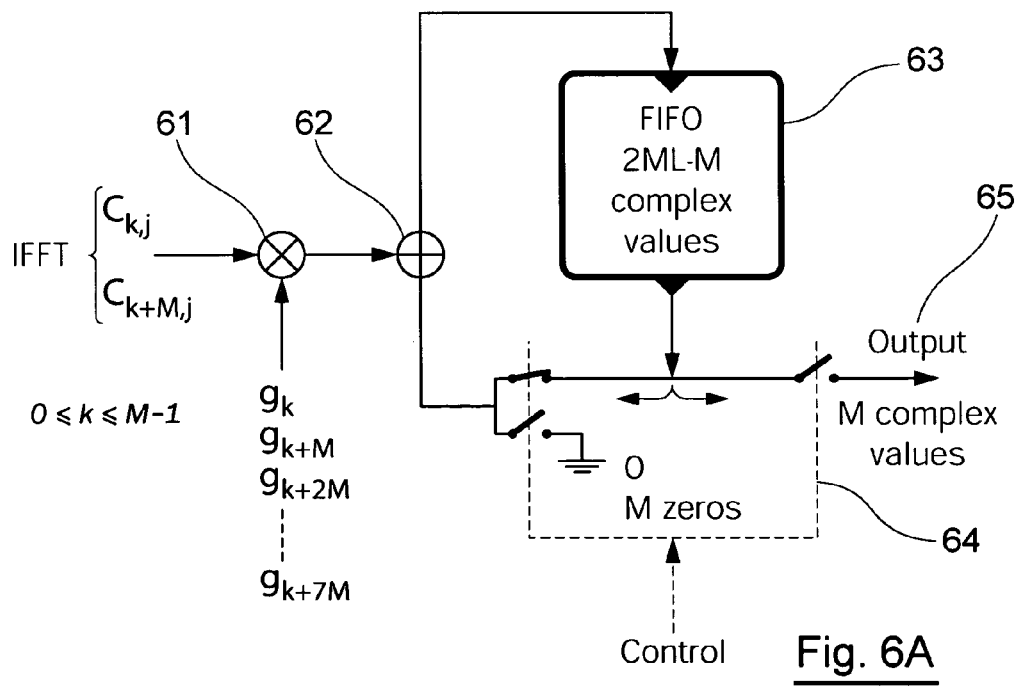
Figure 6B:
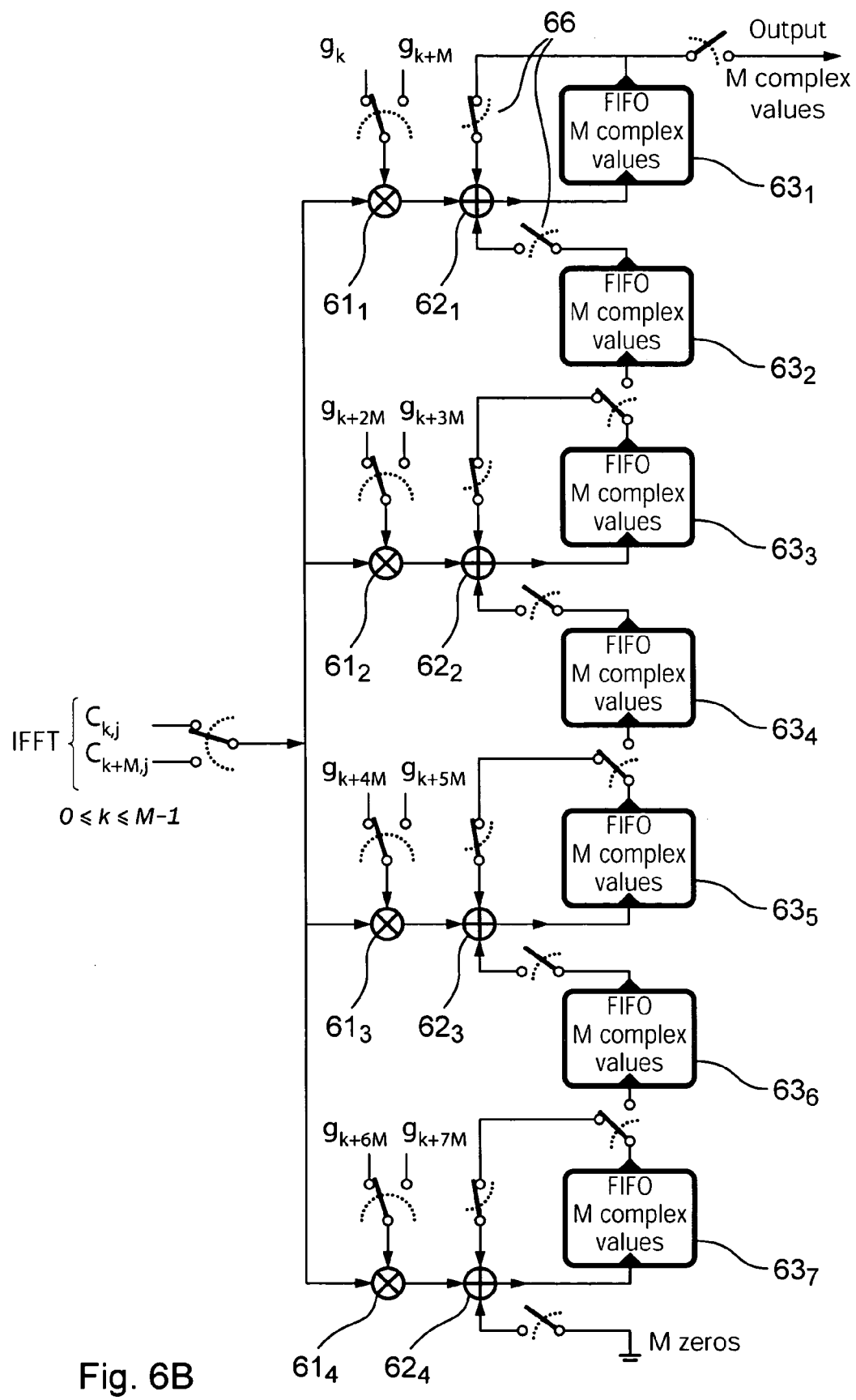
Figure 6C:
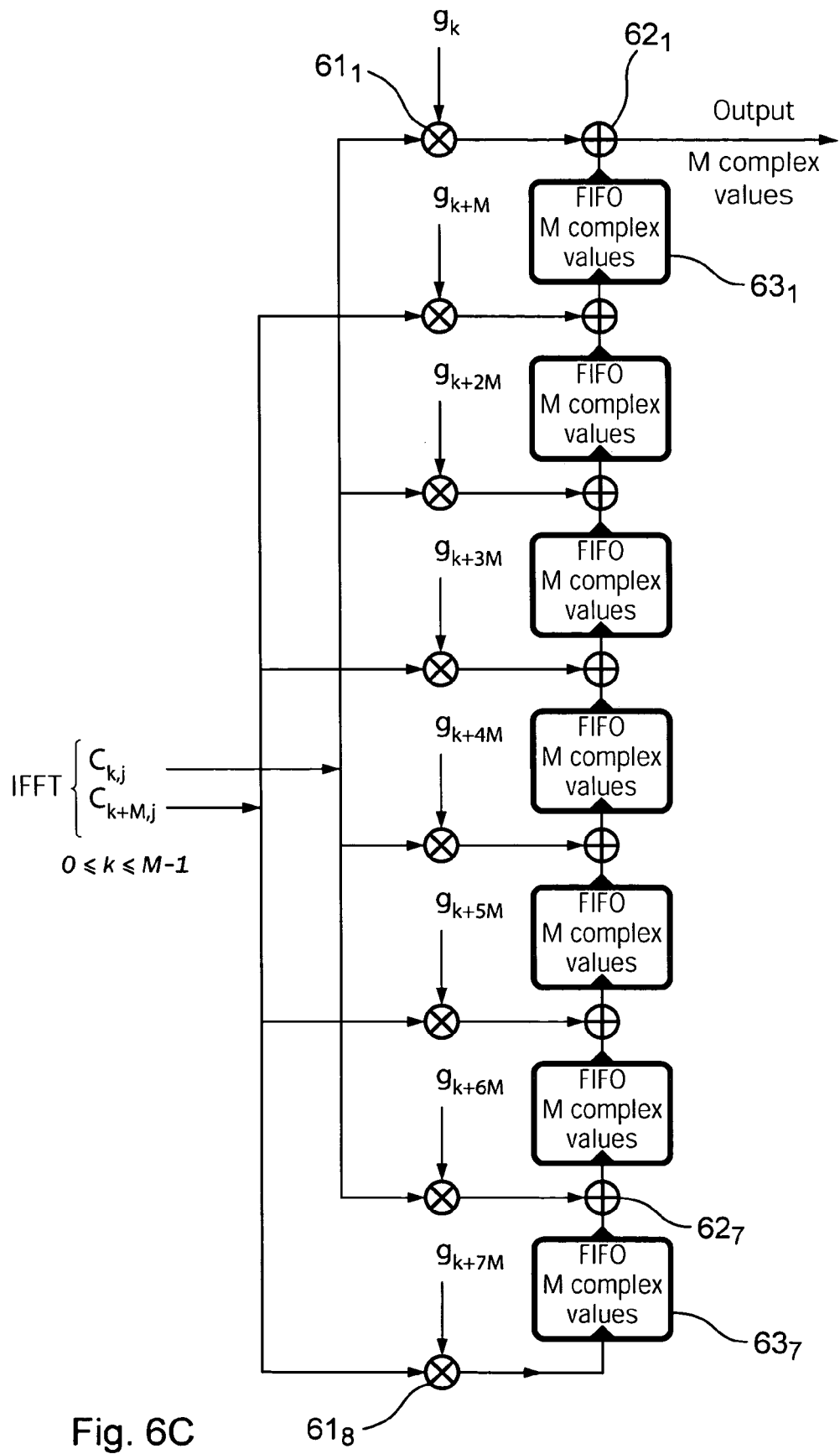
Figure 7:
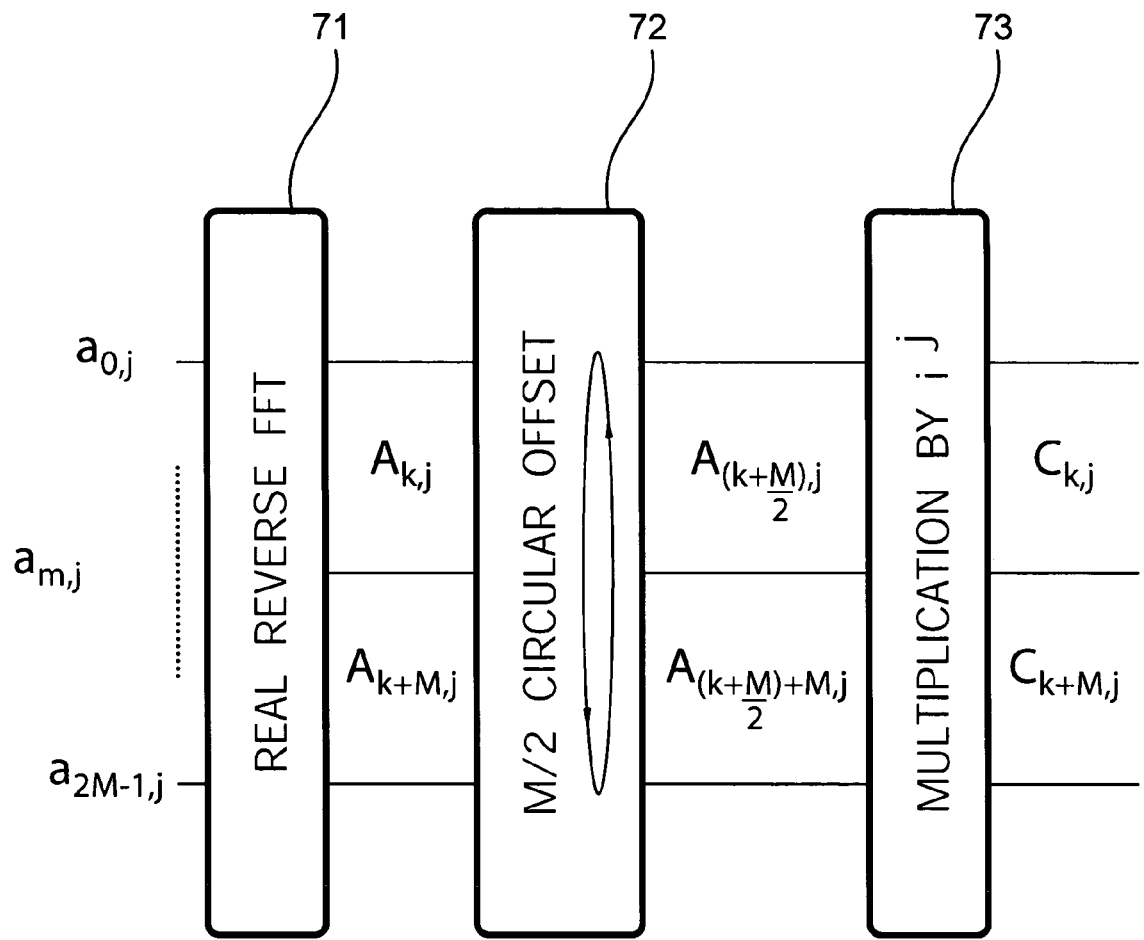
Figure 8:
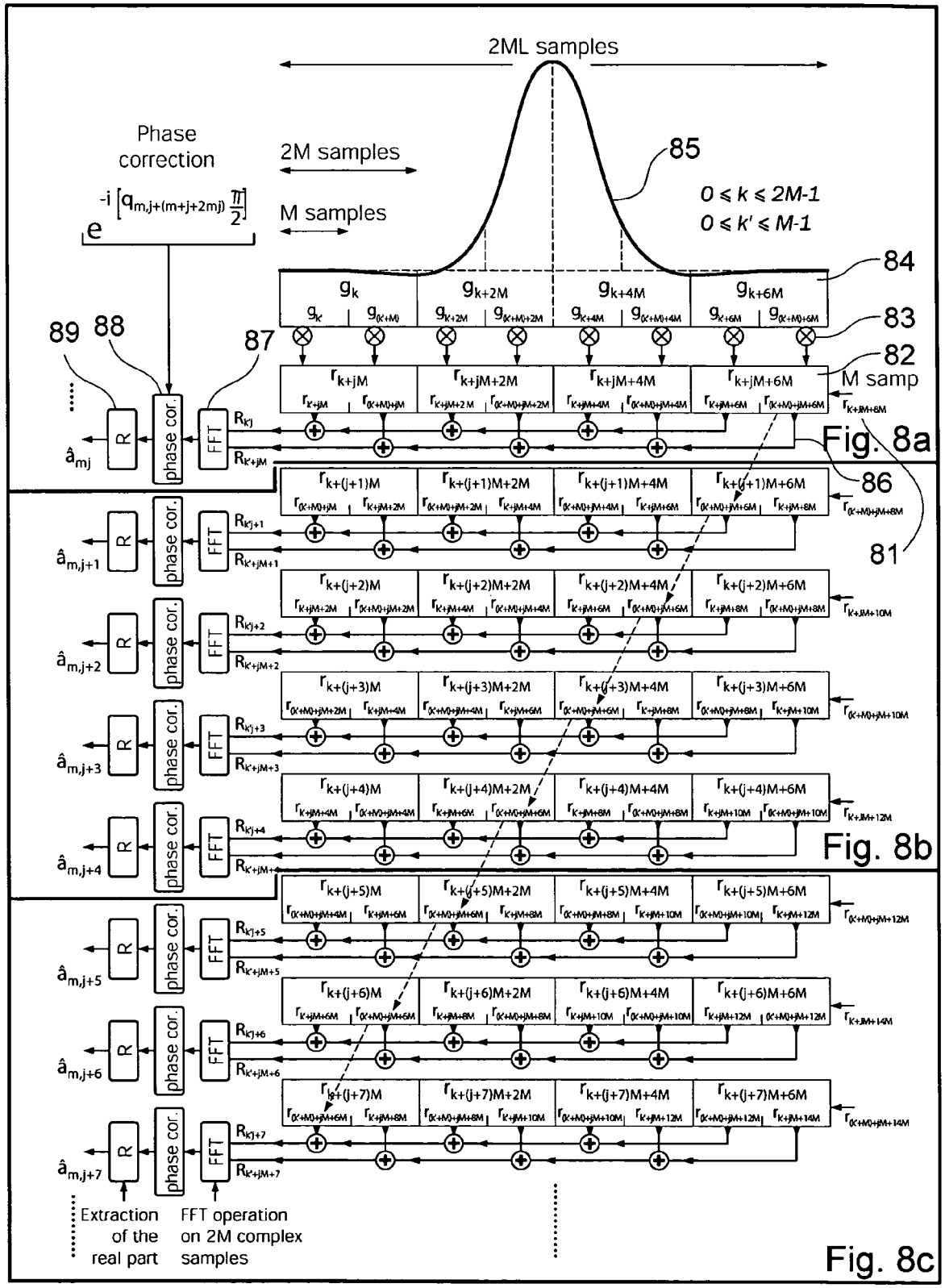
Figure 8A:
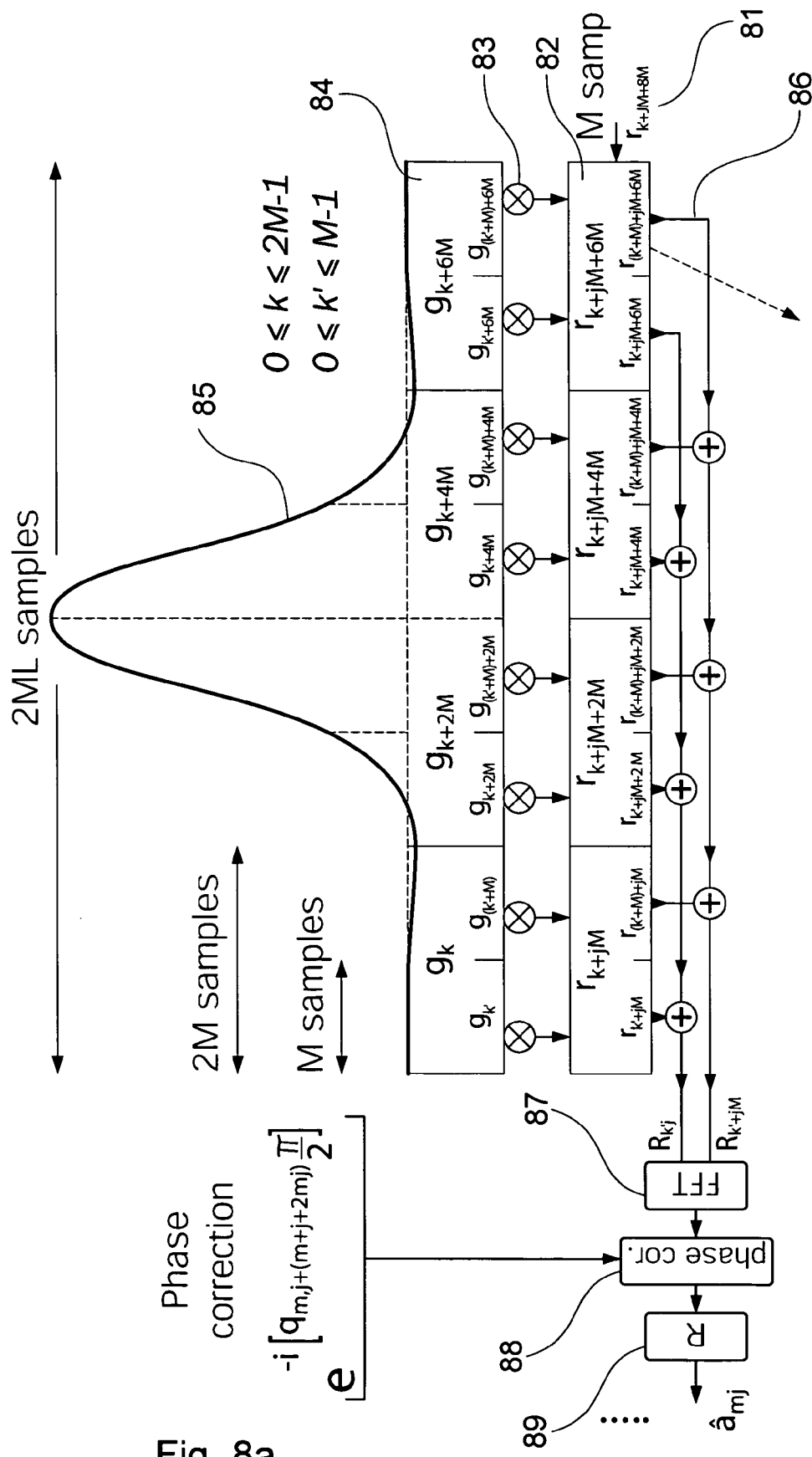
Figure 8B:
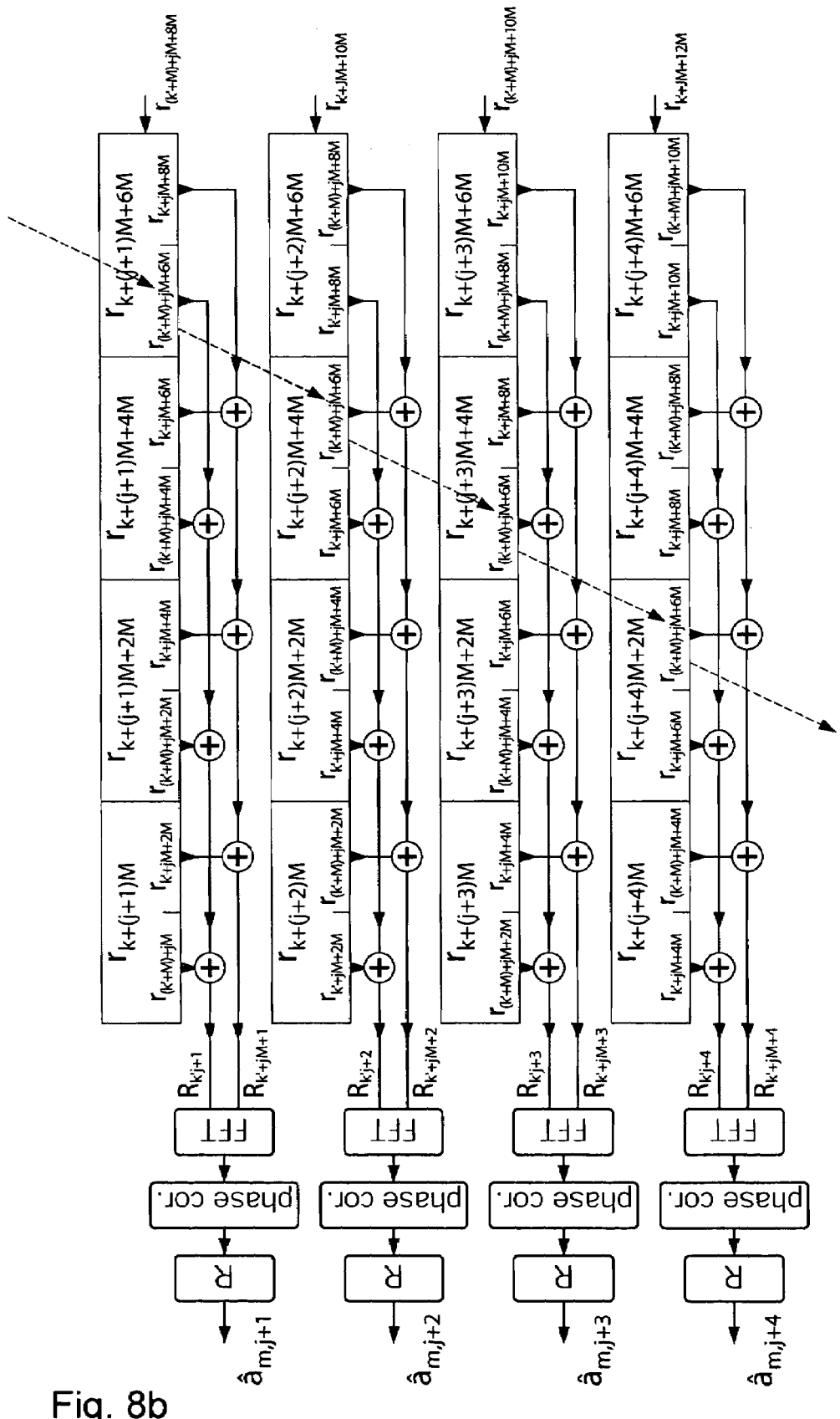
Figure 8C:
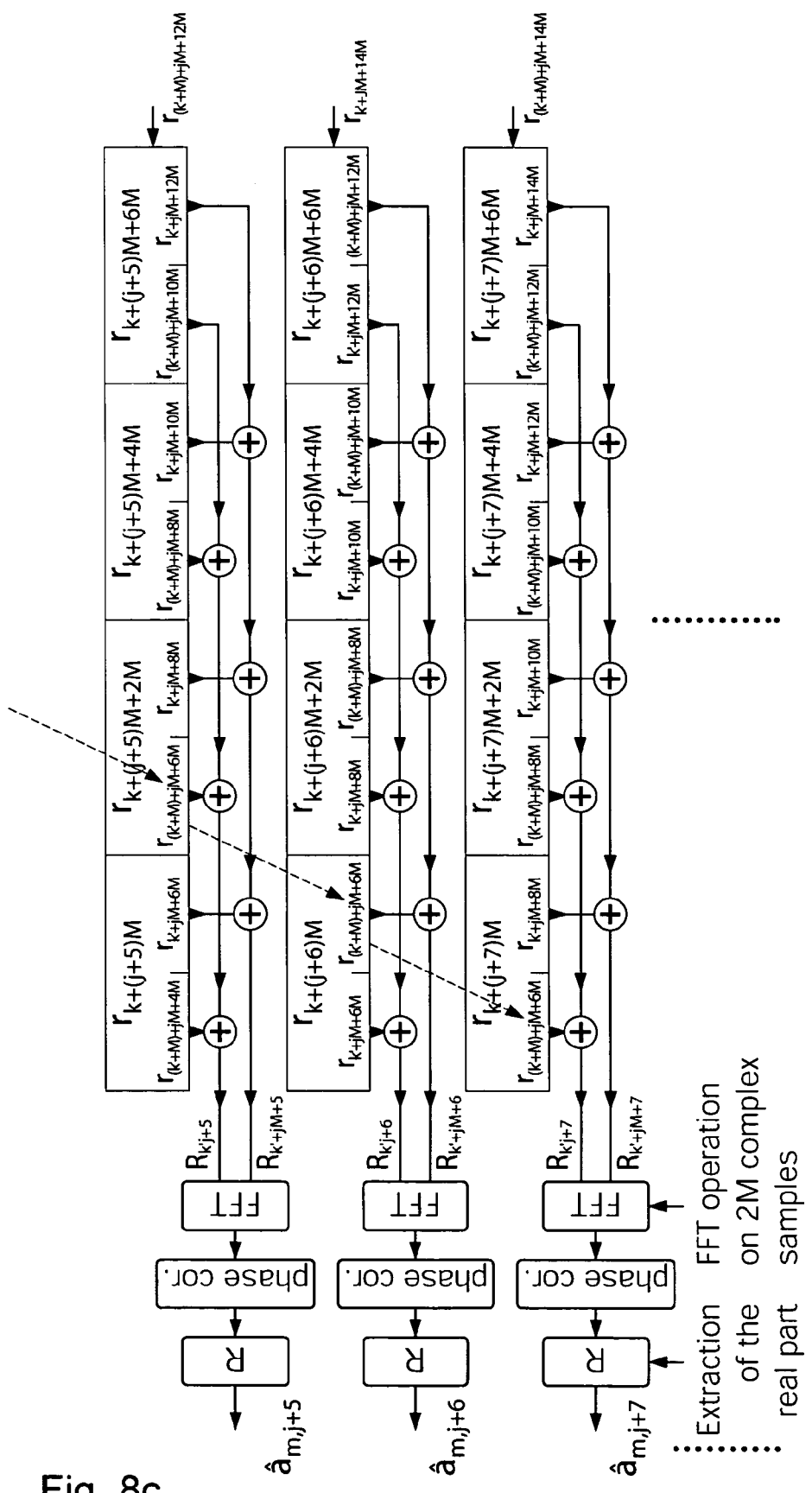

FIG. 5 is a schematic diagram of a complex IFFT circuit known per se;

FIGS. 6A to 6C illustrate the optimized architectures implementing FIFO systems and respectively using a single multiplier (FIG. 6A), L multipliers (FIG. 6B) or 2L multipliers (FIG. 6C);

FIG. 7 shows an optimized embodiment of the reverse FFT using a real input FFT;

FIG. 8 illustrates the working of the demodulation method of the invention when L=4;

FIGS. 8a, 8b and 8c are closer views of portions of FIG. 8, broken out as indicated by the lines on FIG. 8.

Figure 9:
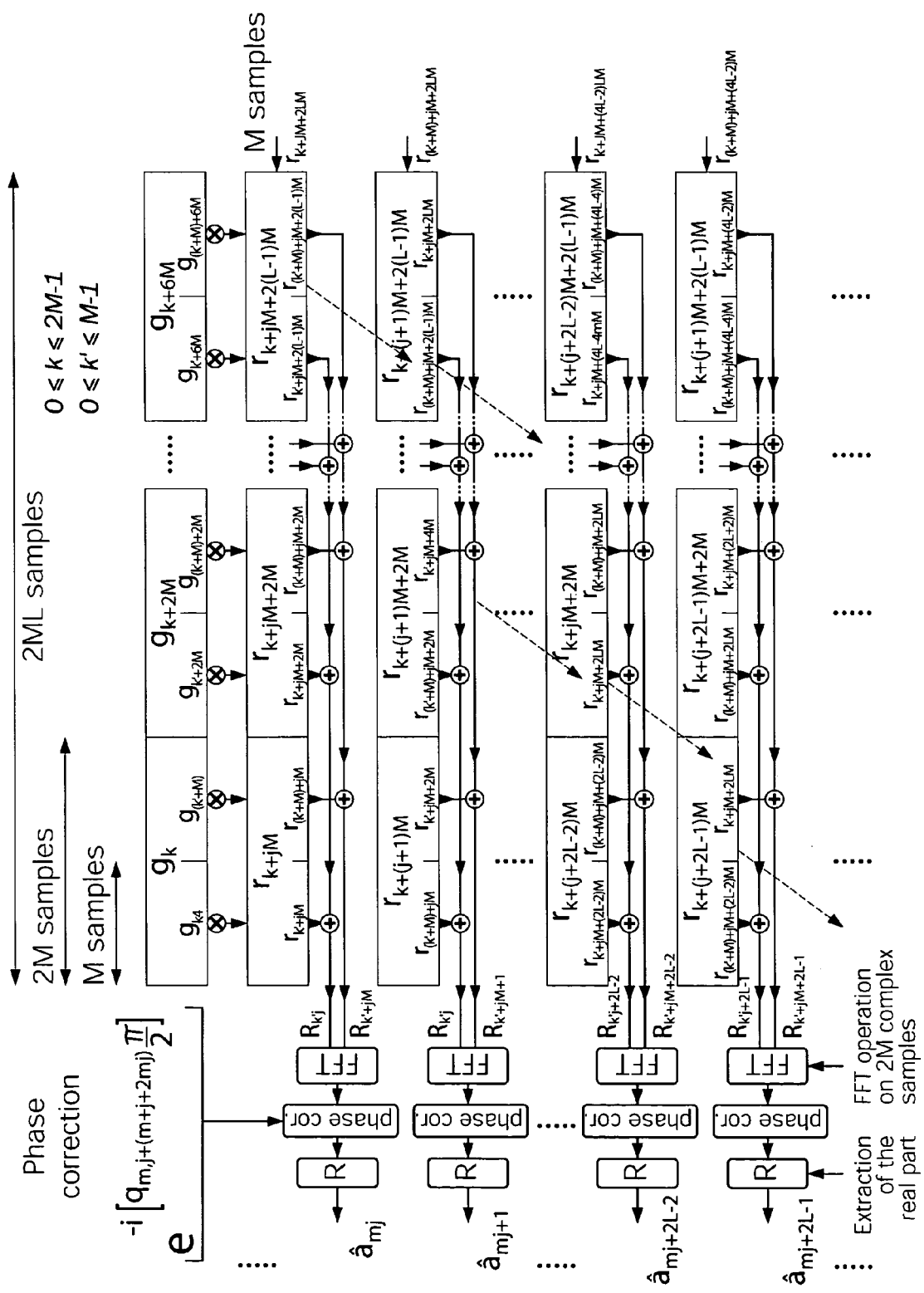
Figure 10:
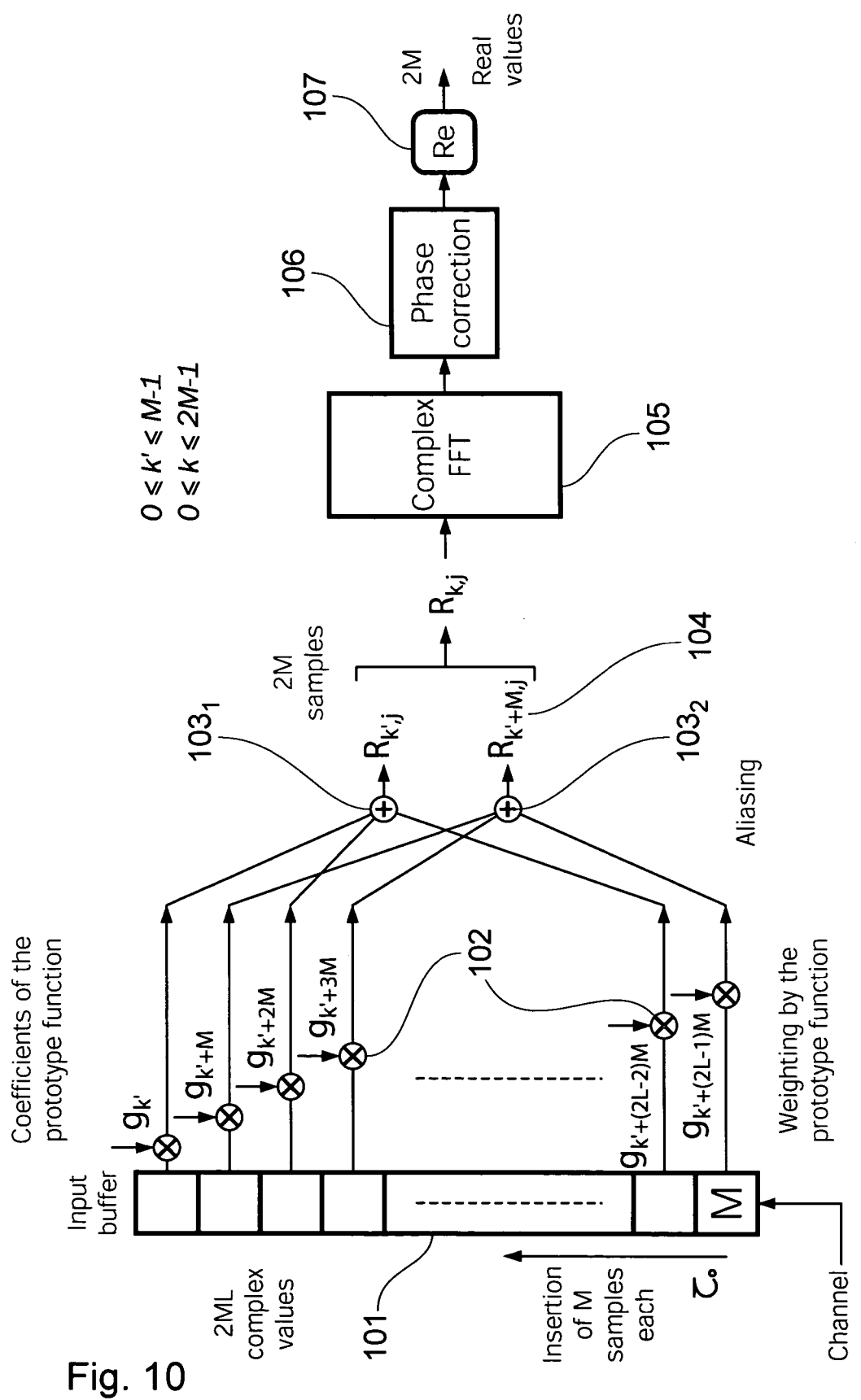
Figure 11:
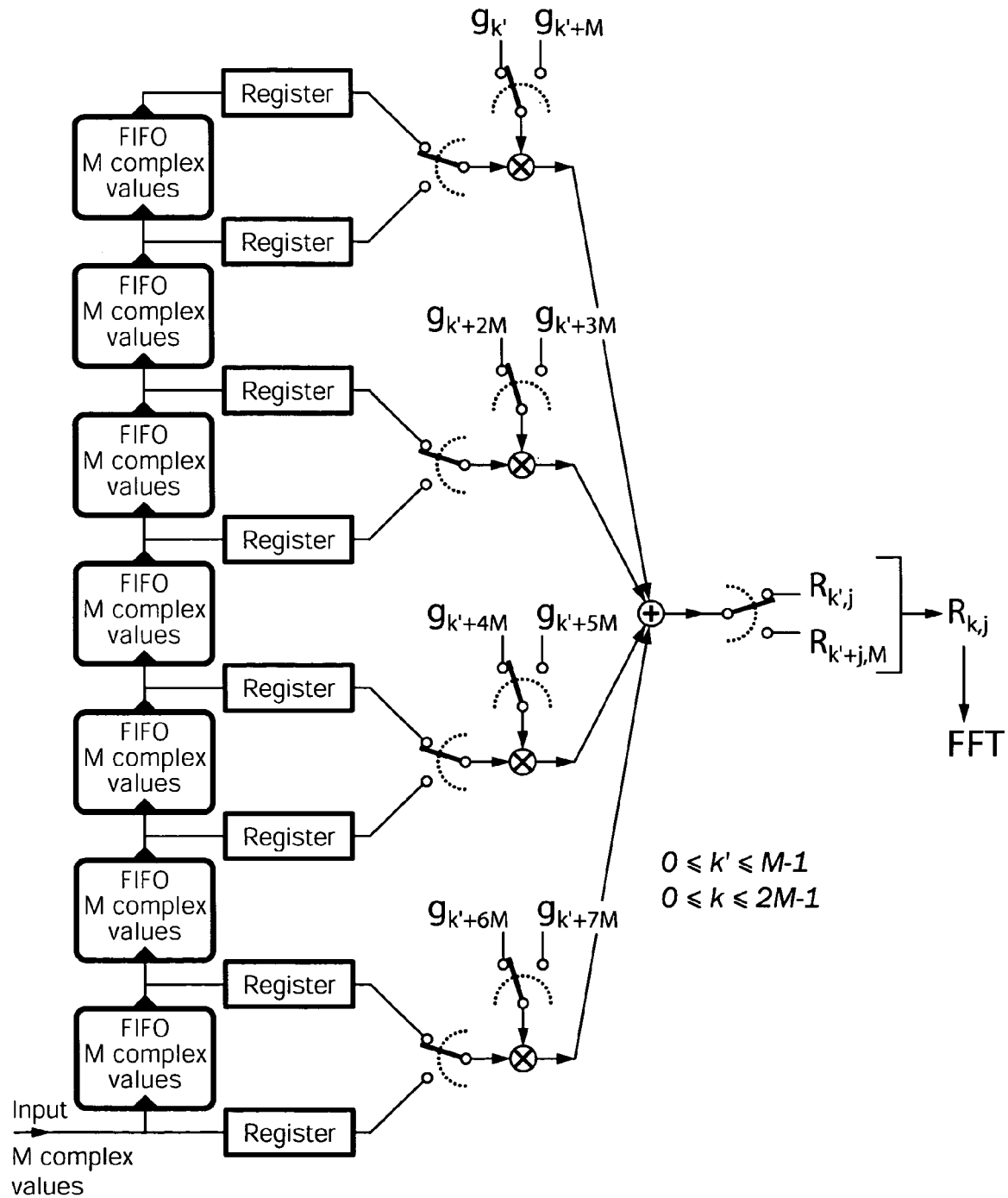
Figure 12:
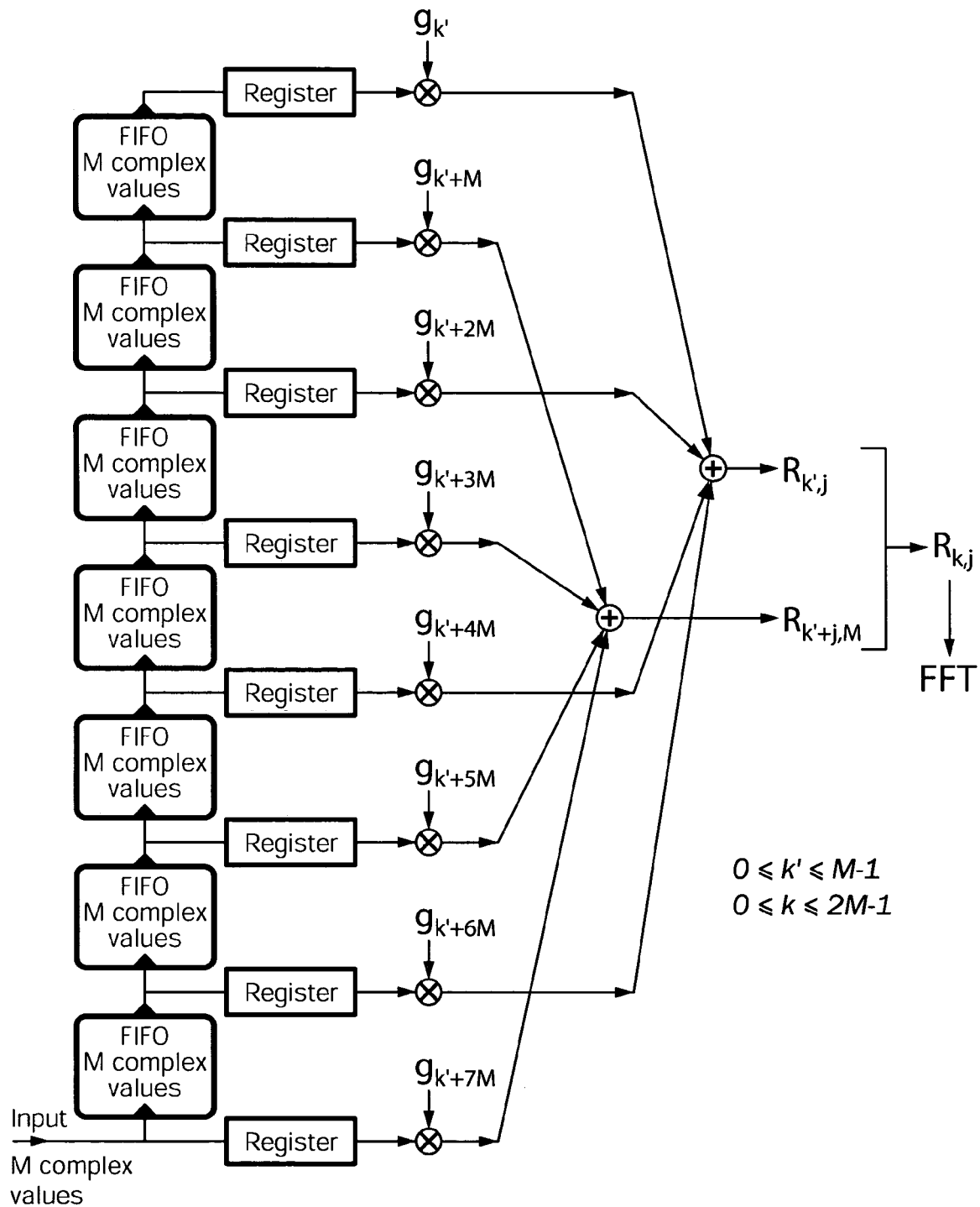

FIG. 9 shows the general case of demodulation deduced directly from FIG. 8;

FIG. 10 illustrates a corresponding demodulator architecture;

FIGS. 11 to 12 show two modes of implementation of the reception filtering in the case of a FIFO structure respectively using L and 2L multipliers.

5-2 Notations

Intercarrier spacing: $\nu_o$.

Intersymbol duration: $\tau_o$.

Density of the network: $1/(\nu_o \tau_o)=2$.

Band allocated to the signal: $W=2M\nu_o$.

Sampling frequency: $f_e=1/T_e=M/\tau_o$.

Length of truncation of the protocol function: $2L\tau_o$.

In theory, the prototype function is the temporal support and/or infinite sequential support. However, to implement the corresponding digital filter, this function must be truncated.

This is the case in OFDM/OQAM/NYQUIST (infinite temporal support) and in OFDM/OQAM/IOTA (infinite temporal and frequency supports). Typically, for the function Iota, L=4 at the minimum. For a sampling at $T_e$ defined here above, the digital function will have the length of 2LM real coefficients.

Indices of the samples:

To be consistent with the formula given hereinafter, the following is noted:

$$x_k = x\left(k\frac{\tau_0}{M} - L\tau_0\right) \qquad (2)$$

$$x_{k+LM} = x\left(k\frac{\tau_0}{M}\right)$$

the prototype function g(t), the emitted signal s(t) and the emitted signal r(t) may be substituted for x(t).

5-3 Modulation Algorithm

5-3-1 Principle

The baseband signal centered on the frequency $Mv_o = f_e/2$, is written as follows:

$$s(t) = \sum_n \sum_{m=0}^{2M-1} \underbrace{a_{m,n} i^{m+n} e^{2i\pi m v_0 t}}_{c_{m,n}} g(t - n\tau_0) \quad (3)$$

A sample of the signal is therefore written as:

$$s\left(p\frac{\tau_0}{M}\right) = \sum_n \sum_{m=0}^{2M-1} a_{m,n} i^{m+n} e^{2i\pi \frac{mp}{2M}} g\left((p-nM)\frac{\tau_0}{M}\right) \quad (4)$$

With the notations introduced here above (formula 2)), we have, after computation:

$$s_p = \sum_n \sum_{m=0}^{2M-1} a_{m,n} i^{m+n} e^{2i\pi \frac{mp}{2M}} (-1)^{mL} g_{p-nM} \quad (5)$$

Given the rapid decrease of the prototype function, only the samples indexed 0 to 2ML−1 are considered to be non-zero. We should therefore have $0 \leq p - nM \leq 2ML-1$. Taking $p = k + jM$ whose $0 \leq k \leq M-1$, we obtain $J-(2L-1) \leq n \leq j$.

The equation (5) becomes.

$$s_{k+jM} = \sum_{n=j-(2L-1)}^{j} \sum_{m=0}^{2M-1} a_{m,n} i^{m+n} (-1)^{m(n+L)} e^{2i\pi \frac{m(k+(j-n)M)}{2M}} g_{k+(j-n)M} \quad (6)$$

Finally, assuming $q = j - n$, we obtain the formula from which we derive the modulation algorithm:

$$s_{k+jMl} = \quad (7)$$

$$\sum_{q=0}^{2L-1} \sum_{m=0}^{2M-1} \underbrace{\underbrace{\underbrace{a_{m,(j-q)} i^{m+(j-q)} (-1)^{m(j-q+L)}}_{\text{Pre-modulation}} e^{2i\pi \frac{m(k+qM)}{2M}}}_{\text{Reverse } FFT} \cdot g_{k+qM}}_{\text{Weighting by the prototype function } g(t)}$$

with $\begin{cases} 0 \leq k \leq M-1 \\ j \in Z \end{cases}$

Noting $C_{mj-q}$ as the pre-modulated input values giving:

$$c_{m,j-q} = a_{m,(j-q)} i^{m+(j-q)} (-1)^{m(j-q+L)}$$

the equation (7) becomes:

$$s_{k+jM} = \sum_{q=0}^{2L-1} \left( \sum_{m=0}^{2M-1} c_{m,j-q} e^{2i\pi \frac{m(k+qM)}{2M}} \right) g_{k+qM} \quad (8)$$

This formula leads to a modulation algorithm in three main steps:

Pre-modulation of the data elements by means of a simple complex multiplication.

Reverse Fourier transform (by IFFT algorithm).

Filtering by the prototype function.

Here, as in the rest of the document, the term filtering is understood to mean an operation of weighting of the results of 2L reverse FFT operations by certain values of the prototype function, followed by an operation of summing of these weighted coefficients. In other words, this is a linear combination.

Here below, we present two possible modes of implementation. The second mode is optimal and is more precisely the object of the invention.

Although in practice, the work is done at the sample rate $\tau_o/M$, we shall retain the block structure of M samples to describe these modes of implementation with greater clarity.

5-3-2 Direct Architecture

In view of the formula (8), it is necessary to perform 2L complex IFFT operations with a size 2M to generate M samples (corresponding to the duration of a multicarrier symbol $\tau_o$).

However, the result of an IFFT comes into play on the computation of 2L consecutive blocks of samples. To compute the M current samples, it is therefore necessary to compute only the reverse Fourier transform of the 2M last data elements entered into the modulator, the results of the 2L−1 other IFFT values having been computer in the previous steps and stored in the memory.

The modulation algorithm therefore comprises the following main steps:

The pre-modulation of the 2M real inputs delivering 2M complex values.

The reverse Fourier transform with a size of 2M complex values (IFFT algorithm).

Storage of the result by re-updating a buffer with a size of 2L*2M complex values (containing the results of the 2L reverse FFT operations indicated in the computations).

Filtering of the 2LM elements of the storage buffer by the prototype function.

Sending of the M complex samples thus computed.

The requisite memory size is therefore:

a RAM with a size of 2L*2M complex values (input buffer), a ROM with a size of ML+1 real values (weighting coefficients).

(The prototype function is chosen to be symmetrical, on the 2ML weighting coefficients, and only the ML+1 values are distinct).

This first procedure reveals a waste of RAM type memory. The second architecture proposed shows that it is possible to reduce the size of the necessary RAM by more than half. This reduction is accompanied by a reduction in the number of operations and therefore an increase in the processing speed.

5-3-3 Optimized Architecture

It is possible to optimize the architecture of the modulator according to the invention, both at the level of the filtering by the prototype function and that of the reverse FFT. Indeed, in analyzing the formula (8), it can be ascertained that for each of the 2L IFFTs involved in the computation of the current block of M samples, only M points on 2M are used.

It is then possible to reduce the required RAM type memory by half by storing the data elements used for the computations of the different blocks of samples after filtering, and not before. Furthermore, the specific structure of the complex data elements at input of the reverse FFT ($a_{m,n}(-1)^{m(n+L)}i^{m+n}$) enables the use of a reverse FFT algorithm with real inputs.

In order to specify this method, we shall develop the formula (8):

$$s_{k+jM} = \sum_{q'=0}^{L-1} \left[ \sum_{m=0}^{2M-1} c_{m,j-2q'} e^{2i\pi \frac{mk}{2M}} g_{k+2q'M} + \sum_{m=0}^{2M-1} c_{m,j-(2q'+1)} e^{2i\pi \frac{m(k+m)}{2M}} g_{k+(2q'+1)M} \right]$$

Let:

$$C_{k,n} = \sum_{m=0}^{2M-1} c_{m,n} e^{2i\pi \frac{mk}{2M}} \quad \text{and} \tag{9.1}$$

$$C_{k+M,n} = \sum_{m=0}^{2M-1} c_{m,n} e^{2i\pi \frac{m(k+M)}{2M}} \tag{9.2}$$

We have:

$$s_{k+jM} = \sum_{q'=0}^{L-1} [C_{k,j-2q'} g_{k+2q'M} + C_{k+M,j-(2q'+1)} g_{k+(2q'+1)M}] \tag{10}$$

with $0 \leq k \leq M-1$

The equation (10) expresses the construction of M complex values from 2ML complex values. It can be written more generally:

$$s_{k+jM} = \sum_{q=0}^{2L-1} [\alpha_{k,q} C_{k,j-q} + \beta_{k,q} C_{k+M,j-q}] \text{ with } 0 \leq k \leq M-1 \tag{11}$$

In the embodiment described, $$\alpha_{k,q} = \begin{cases} 0 & \text{if } q \text{ is odd - parity} \\ gk+qM & \text{if } q \text{ is even - parity} \end{cases} \text{ and}$$

$$\beta_{k,q} = \begin{cases} gk+qM & \text{if } q \text{ is odd - parity} \\ 0 & \text{if } q \text{ is even - parity} \end{cases}$$

Figure 1:
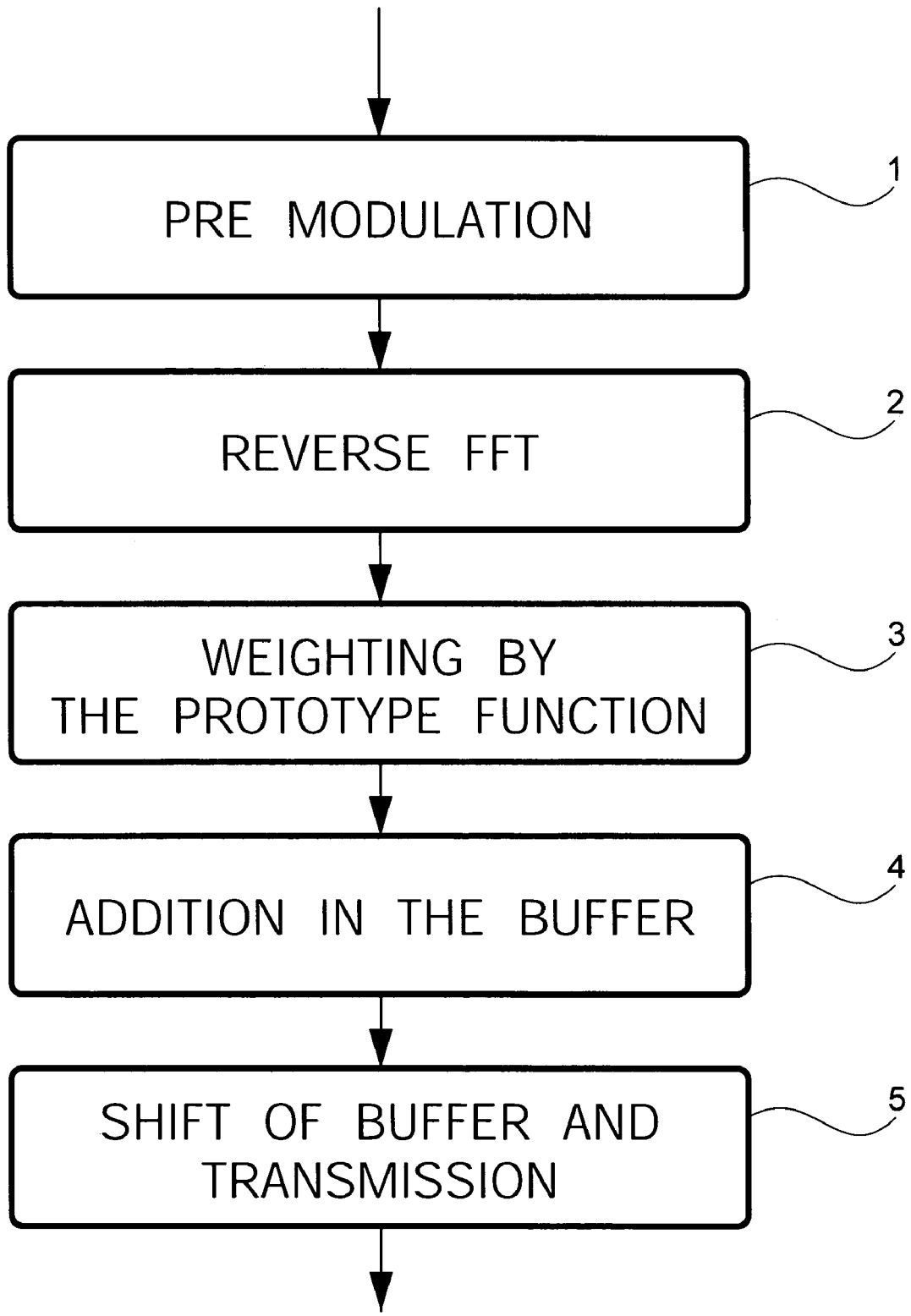

To generate M samples according to this modulation algorithm, it is therefore possible to proceed as illustrated in FIG. 1 (step j):

Pre-modulation 11 of the 2M real inputs.

Reverse Fourier transform 12 of the 2M complex data elements thus obtained so as to generate $C_{kj}$ and $C_{k+Mj}$.

A weighting 13 (corresponding to the application of the prototype function) of the result of the reverse Fourier transform by the prototype function: L parallel weighting operations.

The L weighting vectors, with a size 2M, have the following coefficients:

$[g_o, \ldots, g_{2M-31}]$, $[g_{2M}, \ldots, g_4M-1]$, ..., $[g_2LM-2M, \ldots, g_2LM-1]$.

The addition 14 of these weighting results to the output buffer of with a size of 2ML complex values.

The shifting 15 of the output buffer with the sending of M samples, corresponding to the M oldest values contained in the buffer.

A sample of the signal to be transmitted represents a sum of 2L weighted IFFT results. Each block of M consecutive memory slots of the output buffer contains M partial sums of $2L-m_{block}$ terms each, where $m_{block}$ varies from 1 to 2L ($m_{block}=2L$ corresponds to the "all at zero" block, due to the buffer shift operation (step 14) at the instant $(j-1)\tau_o$). The 2ML elements coming from the L parallel weighting operations are herein added to the 2ML elements of the buffer.

After this operation, the M partial sums of the buffer corresponding to $m_{block}=1$ are completed, namely the M current samples are computed and may therefore be transmitted.

Figure 2:
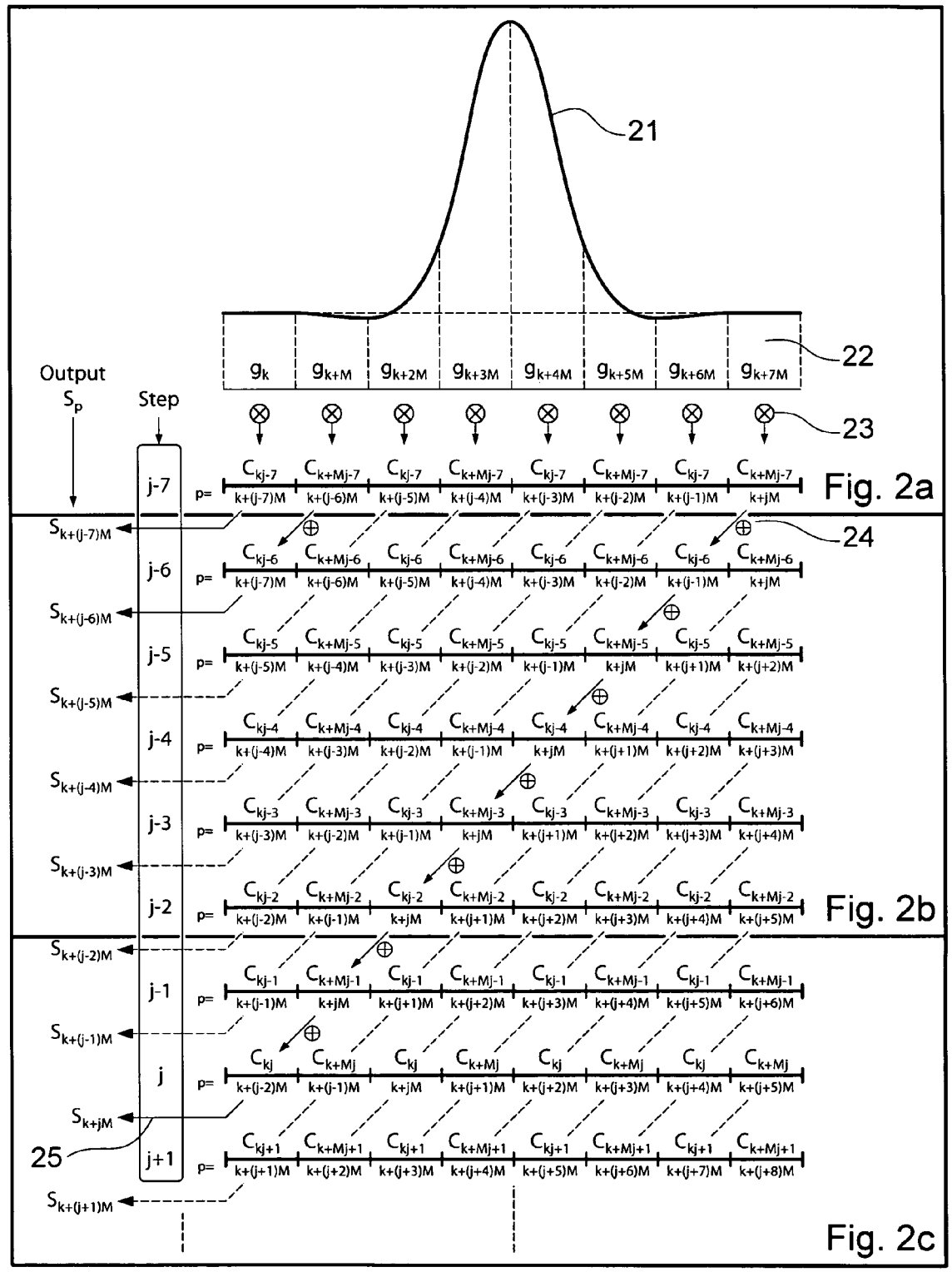
FIG. 2 illustrates the gradual construction of the M samples where L=4; for the Iota waveform.
Figure 2A:
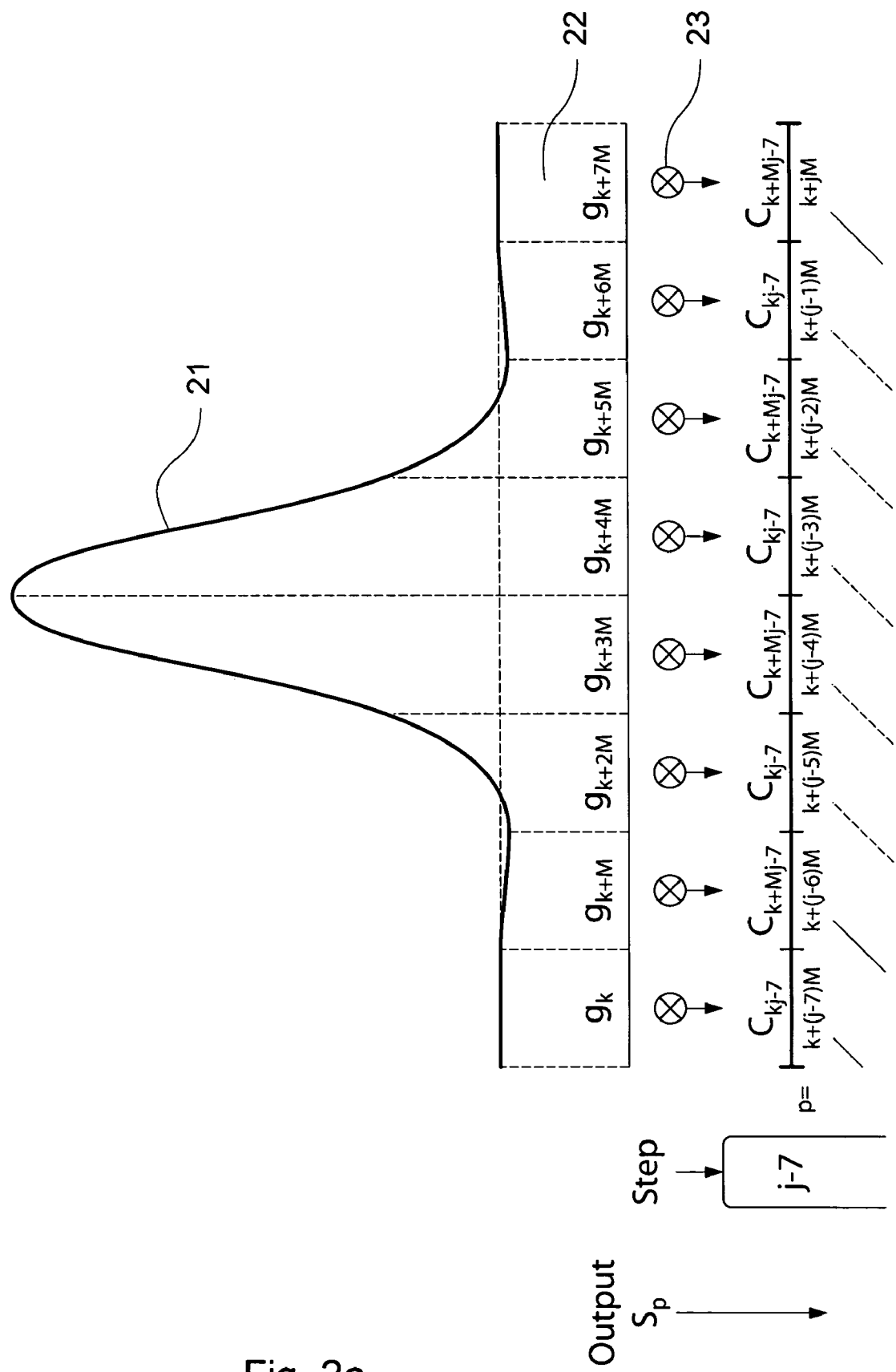
FIGS. 2a, 2b and 2c are closer views of portions of FIG. 2, broken out as indicated by the lines on FIG. 2.
Figure 2B:
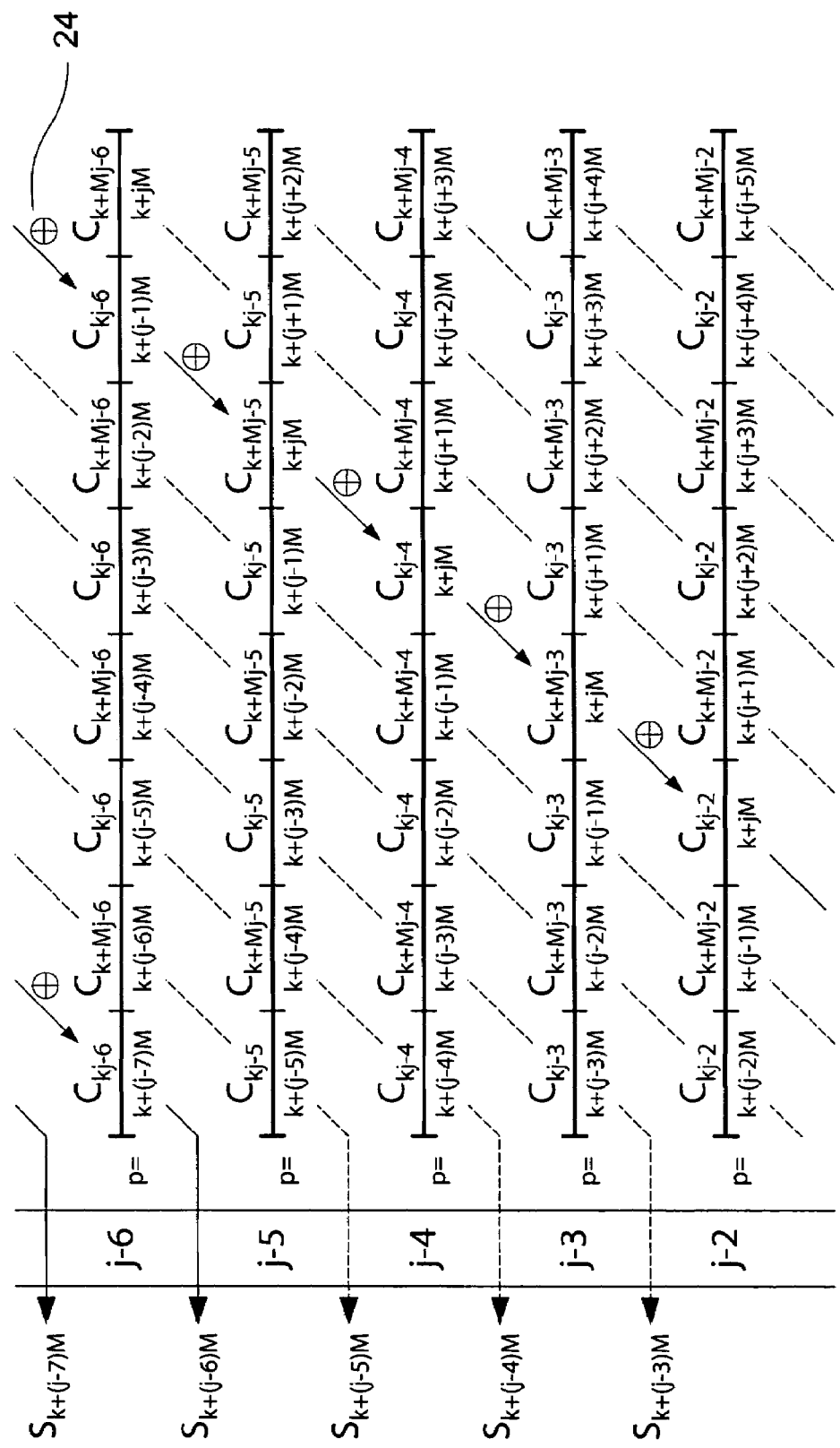
Figure 2C:
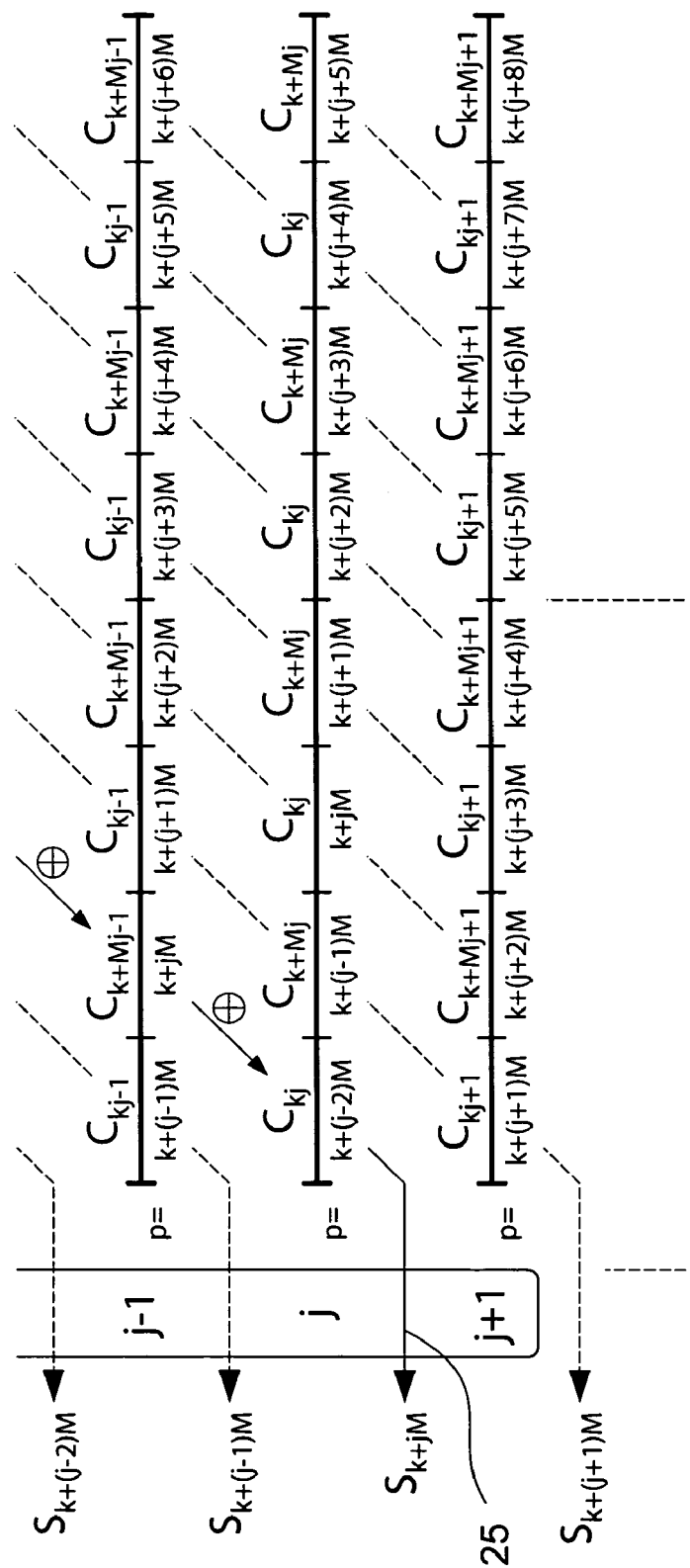

This operation is described in FIG. 2, where L=4. Each line illustrates the situation of the construction buffer of the data elements to be transmitted, at a given instant. It is necessary to have 2L consecutive symbol times to gradually construct a sample to be transmitted.

The waveform 2L shown corresponds to the Iota function. It is represented by the 2L vectors of coefficients 22 $[g_k]$ to $[g_{k+7m}]$, where the index k varies from 0 to M-1.

At each instant, the 2M coefficients at input are multiplied (23) by the coefficients 22 and then added up (24) each to a partial sum.

The M partial sums complemented at the step 15 are transmitted, the contents of the buffer are shifted by M memory slots (so as to ensure the right order of computation of the next M samples) and M zeros are inserted in the M vacant memory slots.

The diagonal 25 thus illustrates the computation of $S_{k+jM}$.

FIG. 3 give a more detailed view of the working of this algorithm for the instants j−1 to j+2. If we consider the instant j, the coefficient $a_{mj}$ to be transmitted supplies the pre-modulation module 31, which gives the reverse FFT 32 the coefficients $c_{mj}$. The reverse FFT delivers the $C_{kj}$ and $C_{k+Mj}$ values (the index k varies from 0 to M−1) subjected to the weighting 33 (the weighting operations in parallel) to deliver the results 34 which are summed up in an output buffer 35.

FIG. 3 gives an indication of the exact contents of these output buffers.

FIG. 4 illustrates the triggering of this modulation procedure where L=4.

The architecture of the modulator corresponding to the above algorithm presented here above must therefore comprise:

a ROM with a size of ML+1 real values containing the coefficients of the filter, a RAM with a size of 2ML complex values corresponding to the output buffer, a complex FFT circuit (achieving a reverse FFT) with a size 2M.

To increase the processing speed, the weighting operations will be made parallel by using L RAMs with a size 2M associated with L multipliers or even 2L RAMs with a size of M complex values associated with 2L multipliers instead of one RAM with 2ML complex values.

The complexity of the modulation circuit is therefore:

for the filtering.

In order to carry out the filtering, we multiply the results of the complex reverse FFT by the 2ML coefficients of the prototype function, by carrying out L weighting operations in parallel, including the result of the output buffer. Given that the coefficients of the prototype function are real, we have (2×2ML) real multiplications and 2ML complex additions or 4ML real additions. The size of the output buffer is then 2ML complex memories or 4ML real memories.

for the IFFT transform:

The results indicated in the following table relate to a conventional complex IFFT circuit whose schematic diagram is given in FIG. 5. It comprises an input buffer 51, receiving 2M inputs, a computation unit 52 supplied by coefficients stored in the ROM type memory 53 and computed values stored in a RAM type memory 54 that deliver 2M outputs. A control module drives these different elements.

This table gives an estimation of the operations and equipment needed for the modulation part:

| Modulation | Addition Operations (real) | Multiplication Operations (real) | RAM (real) | ROM (real) | FIFO (real) |
|---|---|---|---|---|---|
| Pre-modulation | x | x | x | x | x |
| Reverse FFT | 6 M(1 + log$_2$ M) | 4 M(1 + log$_2$ M) | 8 M | 2 M | x |
| Filtering | 4 ML | 4 ML | 4 ML | ML + 1 | x |

It should be noted that no multiplication or addition is needed for the pre-modulation because the simple complex multiplication to be found at this stage is expressed, at the level of the architecture, by permutations of real and imaginary parts as well as changes of sign.

According to one variant of the invention, an additional gain in memory space may be obtained. It is indeed possible to use only (2L−1) RAMs with M complex values (total storage: 2ML−M complex values instead of 2ML). To do this, at the step j, a reading is done of the M samples to be transmitted into the corresponding RAM gradually, and the M complex values $C_{k+Mj}g_{k+(2L-1)M}$ are written progressively at the same addresses. To carry out this filtering operation, it is possible, as required, to use RAMs or FIFOs.

FIGS. 6A to 6C illustrate this method in the case where a FIFO structure is chosen.

In the case of FIG. 6A, a single multiplier 61 is implemented. It multiplies data elements delivered by the reverse FFT by the weighting coefficients and supplies an adder 62 that also receives the output of the FIFO memory 63 containing 2ML−M complex values. This FIFO 63 is supplied by the result of the addition 62. A control module 64 enables the output of the FIFO to be directed outwards to deliver the M complex values ready to be transmitted 65.

It is possible to use N parallel-connected multipliers, where N=1,2,4, ... 2L.

Thus, in the case of FIG. 6B, L(=4) multipliers $61_4$ to $61_4$ are implemented in parallel. They are supplied alternatively with one or the other of the weighting coefficients associated with them.

Each of them supplies an adder $62_1$ to $62_4$ which also receives data elements from the 2L FIFO memories $63_1$ to $63_7$ each comprising M complex values. The FIFO memory $63_1$ delivers the M complex outputs. Selection means 66 enable the selection of a FIFO memory to be taken into account at each point in time.

FIG. 6C shows the implementation of 2L (=8) multipliers. In this case, the structure no longer requires the presence of control means. The 2L FIFO memories $63_1$ to $63_7$ are each supplied by a multiplier $61_1$ to $61_8$, associated with its own weighting coefficient and associated with an adder $62_1$ to $62_8$.

It must be noted that the reduction of the memory space needed for the output buffer is valuable only if the following two conditions are met:

the algorithm used to obtain the reverse FFT arranges its output in the optimum order $C_{oj}, C_{Mj}, C_{1j}, C_{M+1j}, \ldots, C_{2M-1}$ and works at the rate $\tau_o/(2M)$. Indeed, in the case of outputs arranged in the reverse bits order or even in the natural order, $C_{oj}, C_{1j}, C_{2M-2j}, C_{2M-1j}$, the proposed gain in memory due to this simultaneous reading and writing of the output buffer then requires the reordering of the outputs of the reverse FFT in the optimum order which requires a storage at output of the FFT. In either case, the gain in memory will be negligible or even zero.

The multipliers used, to prevent any storage of the outputs of the reverse FFT, work at a high speed: the rate of operation of N parallel-connected multipliers must be equal to $N\tau_o/(2LM)$, for N=1,2,4, ... 2L.

According to another variant of the invention, it is possible to optimize the revere FFT. Given the <<particular>> complex character of the inputs $(a_{m,n}(-1)^{m(n+1)m(n+L)}]^{m+n})$ of the reverse FFT at transmission, it is possible to use an FFT algorithm with real inputs.

It is known that phase-shifting the inputs $x_m$ of an FFT with a size 2M, by $i^m$ amounts to applying a circular permutation to its outputs $y_k$ by M/2 leftwards. By applying this result, it can be clearly seen that the pre-modulation step:

$$(a_{mn}i^{m+n}(-1)^{m(n+L)})$$

followed by the complex reverse FFT can be done as illustrated in FIG. 7 in the following steps:

real reverse FFT 71 of the data elements $(-1)^{m(n+L)}a_{mn}$, circular permutation 72 by M/2 of the outputs, multiplication 73 by $i^n$.

An algorithm of this kind enables a reduction by half of the memory space needed for the FFT as well as the number of operations. FIG. 5 shows these three operations.

It can be noted that the operation of multiplication by $(-1)^{m(n+L)}$ has been omitted. Indeed, it can be avoided.

At transmission, to generate the baseband signal s(t) (equation 1) digitally, the values of $a_{m,n}$ must be multiplied by $(-1)^{m(n+L)}$. In reception, the estimation of the data requires this multiplication again as shall be seen hereinafter.

Given the fact that the withdrawal of this multiplier term has no effect on the orthogonality of the time-frequency translated values, it is possible to remove the need for this multiplication. This amounts then to generating the baseband signal centered on the frequency $Mv_o=f_e/2$ according to:

$$s(t) = \sum_n \sum_{m=0}^{2M-1} a_{m,n}(-1)^{m(n+L)} e^{i\varphi_{m,n}} e^{2i\pi m v_0 t} g(t - n\tau_0).$$

-continued $$\Re e\left[\frac{1}{\rho_{m,j}} e^{-i\theta_{m,j}}(-i)^{m+j}\frac{1}{W}\sum_{p \in Z} r\left(p\frac{\tau_0}{M}\right) e^{-2i\pi m \frac{p}{2M}} g\left((p - jM)\frac{\tau_0}{M}\right)\right]$$

Resuming the notations given by the formula (2) and taking account of the limited number of coefficients representing the prototype function (2ML), we obtain a demodulation formula as follows:

$$\hat{a}_{mj} \approx \Re e\left[\underbrace{\frac{1}{\rho_{mj}} \underbrace{\frac{e^{-i\theta_{m-1}}(-1)^{m(j+L)}}{W}}_{\text{phase and amplitude correction}} \sum_{k=0}^{2M-1} \underbrace{\left[\sum_{q=0}^{L-1} r_{k+jM+2qM}\, g_{k+2qM}\right]}_{\text{weighting by the prototype function}} \underbrace{e^{-2im\frac{k}{2M}}}_{\text{Complex FFT}}\right]$$

with $\begin{cases} p = jM + 2qM + k \\ 0 \le k \le 2M - 1 \\ 0 \le q \le L - 1 \end{cases}$

6—Demodulation

The method of demodulation must enaable a recovery of the useful information transmitted through the samples of the signal received in reception. It is assumed here that the "Doppler-delay" channel (the most general case) of the transfer function T(f,t) is perfectly estimated and that it is locally likened to a complex multiplier channel $T_{mj}=_{m,j}e^{i\theta_{mj}}$.

Given the orthogonality of the "time-frequency" translated functions of the prototype function, the information sent at the instant $j\tau_o$, on the carrier m is thus estimated:

$$\hat{a}_{m,j} = \Re e\left[\frac{1}{\rho_{m,j}} e^{-i\theta_{m,j}} \int r(t) g^*_{m,j}(t) dt\right] \quad (12)$$

In practice, we work on the versions sampled at $$\frac{\tau_0}{M} = \frac{1}{W}$$

of the received signal, the demodulation function then becomes:

$$\hat{a}_{m,j} \approx \quad (13)$$

The formula (14) suggests five steps for the fast demodulation algorithm:

weighting of samples received by the prototype function, temporal aliasing, 2M sized complex FTT, phase and amplitude correction, extraction of the real part.

The solution proposed according to the invention to minimize the memory space taken up by the filtering (weighting and temporal aliasing) in reception is as follows:

inserting the M samples received in an input buffer with a size of 2ML complex FFT functions, multiplying the data elements of this buffer by the coefficients representing the prototype function, summing the results of these multiplications (temporal aliasing), applying a direct Fourier transform to the 2M complex values thus obtained, correcting the result of this FFT in phase and amplitude, extracting the real part.

It must be noted that this technique is independent of the way in which the signal has been constructed at transmission. It can be applied to the reception of any type of OFDM/OQAM multicarrier signal.

In order to illustrate the working of this algorithm, we shall break down the complex 2M sized complex signals into two M sized complex sub-signals each, as follows:

$$r_{k+jM+2qM} = \qquad (15.1)$$
$$r_{k'+jM+2qM} \times 1_{\{k \in \{0,\ldots,M-1\}\}} + r_{(k'+M)+jM+2qM} \times 1_{\{k \in \{M,\ldots,2M-1\}\}}$$
$$\text{with} \begin{cases} 0 \le k \le 2M-1 \\ 0 \le k' \le M-1 \end{cases}$$

$$g_{k+jM+2qM} = \qquad (15.2)$$
$$g_{k'+jM+2qM} \times 1_{\{k \in \{0,\ldots,M-1\}\}} + g_{(k'+jM)+2qM} \times 1_{\{k \in \{M,\ldots,2M-1\}\}}$$
$$\text{with} \begin{cases} 0 \le k \le 2M-1 \\ 0 \le k' \le 2M-1 \end{cases}$$

The entry for its part will be referenced $$R_{k,j} = \sum_{q=0}^{L-1} r_{k+jM+2qM} \cdot g_{k+2qM}, k$$

going from 0 to 2M−1.

The estimation of the data elements sent will start after a delay of $(2L-1)\tau_o$. It is necessary indeed that all the received samples comprising the data element $a_{mj}$ should be stored in the input buffer before $\hat{a}_{m,j}$ is computed.

The notations (15.1) and (15.2) here above make it possible, when L=4, the inputs of the FFT needed for the estimation of $a_{m,O}$, to write these equations in the form (with k'=0 ... M−1):

$$R_{k',0} = r_{k'}g_{k'} + \quad +r_{k'+2M}g_{k'+2M} + \quad +r_{k'+4M}g_{k'+4M} + \quad +r_{k'+6M}g_{k'+6M}$$

$$R_{k'+M,0} = \quad r_{k'+M}g_{k'+M} + \quad +r_{k'+3M}g_{k'+3M} + \quad +r_{k'+5M}g_{k'+5M} + \quad +r_{k'+7M}g_{k'+7M}$$

Similarly, the inputs of the FFT corresponding to the estimation of the values $a_{m,1}$ (m=0 to 2M−1) are thus built:

$$R_{k',1} = r_{k'+M}g_{k'} + \quad +r_{k'+3M}g_{k'+2M} + \quad +r_{k'+5M}g_{k'+4M} + \quad +r_{k'+7M}g_{k'+6M}$$

$$R_{k'+M,1} = \quad r_{k'+2M}g_{k'+M} + \quad +r_{k'+4M}g_{k'+3M} + \quad +r_{k'+6M}g_{k'+5M} + \quad +r_{k'+8M}g_{k'+7M}$$

FIG. 8 illustrates the working of the architecture proposed in the case where L=4. The general case is illustrated by FIG. 9 and is deduced directly from FIG. 8.

In this FIG. 8, the M samples 81 received at an given point in time are stored in an input buffer 82. At each symbol time, the data elements contained in this buffer 82 are multiplied (83) by the weighting coefficients 84 representing the waveform 85 (IOTA in the example) then added up (86) to carry out the aliasing.

The corresponding data elements $R_{kj}$ supply the FFT 87, performed on 2M complex samples. Then a phase correction 88 is done and then an extraction 89 of the real part.

Finally, a shift is made of the contents of the input buffer 82. FIG. 8 presents the contents of this buffer for eight successive instants, corresponding to the production of the outputs $\hat{a}_{mj}$ áâmj+7.

The above formulae represent the case of the demodulator associated with an OFDM/OQAM modulator with a density 2. However, this architecture remains applicable to the case of the restitution of 2M complex values from M complex values resulting from the general case of modulation illustrated by the formula (11). The associated general formula would be:

$$\begin{cases} R_{k',j} = \sum_{q'=0}^{2L-1} r_{k',j+q'} \cdot \alpha'_{k',q'} \\ R_{k'+M,j} = \sum_{q'=0}^{2L-1} r_{k',j+q'} \cdot \beta'_{k',q'} \end{cases} \text{with } k' \in \{0,\ldots,M-1\} \qquad (16)$$

The above algorithm requires the following means:
a RAM with a size of 2ML complex means (input buffer).
a ROM with a size of (ML+1) real values (coefficients of the digital filter),
1, L or 2L complex multipliers depending on the degree of parallel performance of the weighting operations,
a complex FFT circuit with a size 2M.

FIG. 10 illustrates the architecture proposed.

The input buffer, capable of containing 2ML complex values, receives M samples at each $\tau_o$. The weighting by the prototype function is done by the multiplication operations 102 and then the aliasing is done by means of two adders 103$_1$ and 103$_2$, which supply a buffer 104 of 2M values supplying the complex FFT 105.

At the end of the FFT operation 105, a phase and amplitude correction 106 is performed and then the real part is selected at 107 to give the 2M real values transmitted.

Just as at transmission, it is possible to perform the weighting operations in parallel (complex multiplication) by using 2L buffers with a size of M complex values associated with L, or 2L multipliers, rather than a single one with a size of 2ML. These aspects are illustrated respectively by FIGS. 11 and 12. The operation is deduced directly from the one described with reference to FIGS. 6B and 6C for transmission.

It is possible to use only (2L−1) of M complex values (total storage: 2ML−M complex values instead of 2ML) to store the received samples. It is necessary, at the step j, to read the $k^{th}$ (k=0 ... M-1) sample received at the step (j-(2L-1)), and write the $k^{th}$ current sample at the same address.

To perform this operation, it is possible, as needed, to use RAMs or FIFO memories. FIGS. 11 and 12 implement this method in the case of a FIFO structure.

Once again, as at transmission, it must be noted that the reduction of the memory space needed for the input buffer is useful only if the following two conditions are met:

the algorithm used to achieve the FFT works at the rate $\tau_o/(2M)$ with the inputs arriving in the <<optimum>> order $R_{oj}, R_{mj}, R_{lj}, R_{M+1j}, \ldots, R_{M-1j}, R_{2m-1j}$. If not, a storage at the input of the FFT will be necessary and the memory gain will then be negligible or even zero, the multipliers used, also to prevent any storage of inputs of the FFT, work at high speed: the rate of operation of N multipliers in parallel must be equal to $N\tau_o/(2LM)$, for N=1,2,4, ... 2L.

What is claimed is:

1. A method for the modulating of a multicarrier signal with a density $1/(v_o, \tau_o) = 2$, formed by successive symbols, each comprising M samples to be transmitted and constituted by a set of 2M orthogonal carrier frequencies in the real sense, the interval between two neighboring carrier frequencies being equal to $v_o$ and the interval between the times of transmission of two consecutive symbols, or the symbol time, being equal to $\tau_o$, each of said carrier frequencies being modulated according to one and the same modulation prototype function g(t) with a truncation length of $2L\tau_o$, L being an integer representative of said truncation length, comprising, at each symbol time, the following steps:

obtaining a set of 2M complex coefficients representing data to be transmitted;

computing 2LM linear combinations from said 2M complex coefficients obtained, said combination using weighting coefficients representing said prototype function g(t), so as to obtain 2LM coefficients;

summing said 2LM coefficients weighted in predetermined storage locations of a memory comprising 2LM storage locations representing 2L groups of M distinct partial sums, so as to gradually form, in said 2LM storage locations, over a duration of $2L\tau_o$, M samples to be transmitted; and transmitting said samples to be transmitted.

2. A method of modulation according to claim 1, wherein a sample to be transmitted at the instant $j\tau_0 + k\tau_0/M$, referenced $s_{k+jM}$ is written as follows:

$$S_{k+jM} = \sum_{q=0}^{2L-1} [\alpha_{k,q} C_{k,j-q} + \beta_{k,q} C_{k+M,j-q}]$$

where: $C_{oj}$ to $C_{2M-1j}$ are the 2M complex coefficients generated between the instants $j\tau_0$ and $(j+1)\tau_0$;

$\alpha_{k,q}$ and $\beta_{k,q}$ are said weighting coefficients.

3. A method of modulation according to claim 2, characterized in that:

$\alpha_{k,q}$=0 for q as an odd parity number;

$\beta_{k,q}$=0 for q as an even parity number.

4. A method of modulation according to claim 3, comprising, for a generation of a symbol with an index j formed by M samples, the following steps:

obtaining 2M real inputs $a_{m,n}$ representing a source signal;

pre-modulating of each said real inputs producing 2M complex coefficients;

reverse Fourier transforming said 2M complex coefficients producing 2M complex transformed coefficients $C_{0,j}$ to $C_{2m-1,j}$;

for each of the M pairs $(C_{k,j}, C_{(k+M)j})$ of said transformed coefficients, computing 2L weighted coefficients, the weighting coefficients representing said prototype function;

summing the result of each of said weighted 2LM values to the contents of the 2LM distinct memory zones so as to gradually build the samples to be transmitted constituting the symbols j, (j+1), (j+2) ... (j+2L-1); and sending M samples corresponding to the M oldest contents of said memory zones and then resetting the contents of said M memory zones.

5. A method of modulation according to claim 1, wherein said steps are implemented at the rate $\tau_o/M$ of the samples.

6. A method of modulation according to claim 1, wherein said transmission step is followed by a step for updating said memory locations comprising:

physical shifting of the contents of each of said memory locations if the memory contains elements of a shift register; or updating the write and read addresses of said memory locations, if the memory contains elements of a RAM.

7. A method of modulation according to claim 1, wherein said 2M complex coefficients representing data elements to be transmitted are obtained by the implementation of a mathematical transform comprising the following steps:

applying a real reverse Fourier transform;

circular permutating of the result of this reverse transform by M/2 coefficients leftwards; and multiplying of each of said coefficients by $i^n$.

8. A method of modulation according to claim 1, wherein the signal centered on the frequency $Mv_o$ is written as follows:

$$s(t) = \sum_n \sum_{m=0}^{2M-1} a_{m,n}(-1)^{m(n+L)} i^{m+n} e^{2i\pi m v_0 t} g(t-n\tau_0)$$

9. A device for modulating a multicarrier signal with a density $1/(v_o \cdot \tau_o) = 2$, formed by successive symbols, each comprising M samples to be transmitted and constituted by a set of 2M orthogonal carrier frequencies in the real sense, the interval between two neighboring carrier frequencies being equal to $v_o$ and the interval between the times of transmission of two consecutive symbols, or symbol time, being equal to $v_o$, each of said carrier frequencies being modulated according to one and the same modulation prototype function g(t) with a truncation length of $2L\tau_o$, said device for modulating comprising:

means for temporary storage of 2M groups of M partial sums in temporary storage locations;

means for weighting 2M complex coefficients representing data elements to be transmitted by weighting coefficients representing said prototype function g(f); and means for summing the weighted coefficients in respective predetermined memory locations of said temporary storage locations, so as to gradually form said samples to be transmitted on a duration of $2L\tau_o$.

10. A device for modulating according to claim 9, further comprising:
   means for mathematical transformation delivering said 2M complex coefficients representing data elements to be transmitted at the rate $\tau_o/2M$ and in the following order $(C_{nj}, C_{M+1j}), \ldots (C_{M-1j}, C_{2M-1j})$;
   storage means including 2LM−M simultaneous read/write RAM type memory locations; and
   N complex multipliers working at the rate $N\tau_o/2LM$, N being equal to 1,2,4, . . . or 2L.

11. A method for demodulating a received signal corresponding to a transmitted multicarrier signal with a density $1/(v_o.\tau_o)=2$, formed by successive symbols, each comprising M samples to be transmitted and constituted by a set of 2M orthogonal carrier frequencies in the real sense, the interval between two neighboring carrier frequencies being equal to $v_o$ and the interval between the times of transmission of two consecutive symbols, or symbol time, being equal to $\tau_o$, each of said carrier frequencies being modulated according to one and the same modulation prototype function g(t) with a truncation length of $2L\tau_o$, wherein an estimation of 2M real data elements transmitted at a given symbol time is reconstituted by means of the following steps:
   sampling said signal received at the sample frequency $\tau_o/M$, delivering M complex samples received;
   storing each of said M complex samples received in a predetermined location of an input memory comprising 2ML complex locations, in which there have been previously memorized (2L−1)M samples received during the 2L−1 previous symbol times;
   multiplying the 2ML values contained in said input memory by coefficients representing said prototype function;
   temporal aliasing, by summing up 2M series of L results of the multiplication step, so as to obtain 2M complex values; and
   processing said 2M complex values to form said estimations of the 2M real data elements transmitted.

12. A method for demodulating according to claim 11, wherein 2M complex values derived from the temporal aliasing step between the instants $(j+2L-1)\tau_o$ and $(j+2L)\tau_o$ are written as follows:

$$R_{k',j} = \sum_{q'=0}^{2L-1} \alpha'_{k,q} r_{k'+(j+q')M}$$

$$R_{k'+M,j} = \sum_{q'=0}^{2L-1} \beta'_{k,q} r_{k'+(j+q')M}$$

$r_{k'(j+q')M}$ represents the sample received at the instant $k'\tau_o + (j+q')\tau_o/M$; $\alpha'_{k,q}$ and $\alpha'_{k,q}$ are said weighting coefficients.

13. A method for demodulating according to claim 11, wherein:
   $\alpha'_{k,q}=0$ for q' as an odd parity value;
   $\beta'_{k,q}=0$ for q' as an even parity value.

14. A method for demodulating according claim 11, wherein said processing step comprises the following steps:
   applying a mathematical transformation that is the reverse of the one performed during the modulation on said 2M complex values delivering 2M transformed values;
   correcting phase and/or amplitude distortions due to the transmission channel; and
   extracting the real part of said transformed complex values.

15. A method for demodulating according to claim 11, wherein said steps are implemented at the rate $\tau_o/M$ of the samples.

16. A device for demodulating a received signal corresponding to a transmitted multicarrier signal with a density $1/(v_o.\tau_o)=2$, formed by successive symbols, each comprising M samples to be transmitted and constituted by a set of 2M orthogonal carrier frequencies in the real sense, the interval between two neighboring carrier frequencies being equal to $v_o$ and the interval between the times of transmission of two consecutive symbols, or symbol time being equal to $\tau_o$, each of said carrier frequencies being modulated according to one and the same modulation prototype function g(t) with a truncation length of $2L\tau_o$, said device for demodulating comprising:
   means for sampling said receive signal;
   means for temporary storage of the complex samples comprising 2ML complex locations;
   means for multiplying said complex samples by weighting coefficients representing said prototype function;
   temporal aliasing means summing up L weighting results so as to obtain 2M complex values; and
   means for processing said complex values delivering an estimation of 2M real data elements transmitted at each symbol time.

17. A device for demodulating according to claim 16, further comprising:
   means for mathematical transformation that is the reverse of the transformation performed during the modulation on said 2M complex values;
   means for correction of phase and/or amplitude distortions due to the transmission channel; and
   means for extracting the real part of said transformed complex values.

18. A device for demodulating according to any one of the claims 16 and 17, comprising:
   storage means comprising 2ML−M simultaneous write/read RAM type complex memory locations;
   N complex multipliers working at the $N\tau_o/2LM$ rate, where N is equal to 1,2,4 . . . or 2L; and
   means of mathematical transformation working at the $\tau_o/2M$ rate, whose inputs $R_{o,j}$ to $R_{2M-1j}$ are read in the order $(R_{oj}, R_{Mj}), (R_{1j}, R_{M+1j}) \ldots (R_{M-1j}, R_{2M-1j})$.

19. A filtering method delivering series of M complex output values at regular intervals from 2L series of 2M complex input values, said M complex values corresponding to a weighted sum of 2L of said complex input values to be processed, said filtering method comprising the following steps for each series of complex input values;
   computing 2LM linear combinations from said 2M complex input values obtained wherein weighting coefficients are derived from 2L complex or real filters with a size M, so as to obtain 2ML values and
   summing each of the 2ML values in a predetermined memory location out of a set of 2ML memory locations each containing a partial sum so as to gradually form said output values in said 2ML memory locations on a period corresponding to the reception of 2L series of complex input values.

* * * * *